United States Patent
Spinelli et al.

(10) Patent No.: US 11,210,635 B1
(45) Date of Patent: Dec. 28, 2021

(54) CONSTRUCTION MATERIAL DIGITAL CHAIN OF CUSTODY SYSTEM

(71) Applicant: Haul Hub Inc., Haverhill, MA (US)

(72) Inventors: Joseph Spinelli, Harvard, MA (US);
Corey Paradis, Dover, NH (US);
Varadarajan Parthasarathi, Austin, TX (US); Christopher Woodside, Chicago, IL (US); Jordan Grosso, Denver, CO (US)

(73) Assignee: Haul Hub Inc., Haverhill, MA (US)

( * ) Notice: Subject to any disclaimer, the term of this patent is extended or adjusted under 35 U.S.C. 154(b) by 0 days.

(21) Appl. No.: 17/246,223

(22) Filed: Apr. 30, 2021

(51) Int. Cl.
*G06Q 10/10* (2012.01)
*G06K 7/14* (2006.01)

(52) U.S. Cl.
CPC ......... *G06Q 10/103* (2013.01); *G06K 7/1443* (2013.01)

(58) Field of Classification Search
CPC .................. G06Q 10/103; G06K 7/1443
See application file for complete search history.

(56) References Cited

U.S. PATENT DOCUMENTS

| | | |
|---|---|---|
| 2016/0379165 A1 | 12/2016 | Moakley |
| 2018/0186571 A1* | 7/2018 | Shimizu ............... G06Q 10/087 |
| 2018/0338293 A1 | 11/2018 | Pisharody et al. |
| 2019/0130417 A1 | 5/2019 | Watt et al. |
| 2019/0215163 A1 | 7/2019 | Suleiman et al. |
| 2019/0230504 A1 | 7/2019 | Ierullo |
| 2020/0169973 A1 | 5/2020 | Pisharody et al. |
| 2020/0202465 A1 | 6/2020 | Massover et al. |

OTHER PUBLICATIONS

*Delivery note QR code—IMPACT Mobile—Precast Concrete software*, https://www.youtube.com/watch?v=jxUwX_80i7A, Mar. 1, 2019, 1 page screenshot.
StruSoft/Impact Production, https://strusoft.com/precast/software/impact/mobile, 6 pages, Sep. 26, 2020.
*Four Concrete Solutions to Consider During the Age of COVID-19*, https://www.materialsthatperform.com/four-concrete-solutions-consider-during-age-covid-19, Jun. 15, 2020, 3 pages.
ConcreteDirect—Apps on Google Play, https://play.google.com/store/apps/details?id=com.rsm.k.customer&hl=en_US&gl=US, best estimate Apr. 20, 2021, 3 pages.
Dufferin E-Ticketing, Specialty Construction Applications Project Brochure, 2020, 3 pages.

(Continued)

*Primary Examiner* — Matthew Mikels
(74) *Attorney, Agent, or Firm* — Sunstein LLP

(57) ABSTRACT

A digital chain of custody system resilient to wireless connectivity disruption includes an electronic database that stores electronic load tickets, a server, and one or more user communication devices wirelessly coupled to the server, examples of which include a sender communication device, a trucker communication device, and a receiver communication device. Ones of the user communication devices display barcodes that encode contents of respective electronic load tickets, and other ones of the user communication devices image the barcodes and decode the barcodes into digital representations of the electronic load tickets, thereby enabling communication of the electronic load tickets, despite lack of wireless connectivity.

27 Claims, 6 Drawing Sheets

(56) References Cited

OTHER PUBLICATIONS

Customer Case Studies—The Performance Platform for Heavy Construction, Haul Hub Technologies, Apr. 16, 2020, 10 pages.
TMS Tickets, Bulk/Short Hauling Tickets, https://tms-tickets.com/?gclid=CjwKCAjw07qDBhBxEiwA6pPbHU55NVfhU1cdsXKjQeVSesAoq4-IJlTOMjoCq-Ae4PAG7JHWSnR_xoCx2IQAvD_BwE, 2020, 5 pages.
TicketWatch Load & Haul Dump Truck Software web page, https://www.ticketwatch.net/industries.html, Jan. 24, 2021, 12 pages.
HCSS Trucking Ticket Management Software web page, https://www.hcss.com/products/construction-truck-ticket-management, Apr. 13, 2019, 5 pages.
HCSS Trucking Ticket Management Software web page, https://www.hcss.com/products/construction-truck-ticket-management, 2021, 5 pages.
LoadTraxx Shorthaul Load Tracking and Billing Automation web page—https://loadtraxx.com, Jun. 3, 2019, 3 pages.
LoadTraxx Shorthaul Load Tracking and Billing Automation web page—https://loadtraxx.com, 2021, 7 pages.

\* cited by examiner

DUMP TRUCK LOAD FORM

INVOICE #

| JOB # | | DATE | |
|---|---|---|---|
| CUSTOMER NAME | | | |
| JOB LOCATION | | | |
| | | | |
| TRUCK # TGC - | DRIVER NAME | | |
| | | | |

| STARTTIME | LUNCHIN OUT | TIME OUT | TOTAL HOURS |
|---|---|---|---|
| | | | |
| | | | |

| DELIVER LOCATION ADDRESS / DESCRIPTION OF WORK | LOAD COUNT | TOTAL |
|---|---|---|
| | | |
| | | |
| | | |
| | | |
| | | |
| | | |
| | | |
| | | |
| | | |
| | | |
| | | |
| | | |
| | | |
| RECEIVED BY<br>X | | |
| TOTAL = | | |

*(Prior Art)*
*FIG. 6* ated with a respective haul of construction material by a vehicle. Each electronic load ticket includes respective initial load data, including custody data.

CONSTRUCTION MATERIAL DIGITAL CHAIN OF CUSTODY SYSTEM

BACKGROUND

Technical Field

The invention relates to electronic systems for maintaining chain of custody information, such as for construction materials hauled by trucks, and more particularly to such electronic chain of custody systems that are resilient to loss of wireless connectivity.

Related Art

Construction materials, such as ready-mix cement, aggregates, structural steel beams, hot-mix asphalt ("HMA"), etc., are used in a variety of construction projects, such as roads, bridges, tunnels and buildings. Typically, these construction materials are brought to job sites via trucks that load at supplier facilities and unload at the job sites. Frequently, inspectors inspect the construction materials as they arrive at the job sites, such as to ensure the construction materials meet specified quality, quantity and/or timeliness standards. If a truck load of construction material is accepted by an inspector, custody of the load of construction material transfers from a supplier to an owner of the project, such as a municipality or government agency, or to a contractor building the project, typically on behalf of the owner.

Conventionally, a chain of custody of each load is maintained using paper records, often multi-part forms. When a truck is loaded, and typically weighed, a paper load ticket is issued by the supplier. FIG. 6 illustrates a conventional paper load ticket. The supplier keeps one copy of the load ticket. Another copy or two of the load ticket is given to a driver of the truck that hauls the load. When the truck arrives at the job site, one of those copies is given to the inspector, who may make notes on the copy, such as regarding quality of the delivered construction material.

Unfortunately, paper records pose problems. For example, paper records are fragile and subject to damage, particularly in harsh environments present at supplier facilities, en route, and at job sites. For example, rain water weakens paper and makes text, particularly text written using water-soluble ink, on the paper difficult or impossible to read. Furthermore, paper records are often difficult to read under ideal circumstances due to poor handwriting by parties involved.

The construction industry has long felt a need to replace paper load tickets with an electronic system. Due to the dynamic nature of a given load ticket (i.e., preparation of the load ticket, changes to the load ticket due to acceptance/rejection of a load, etc.), geographical diversity of suppliers and job sites, and the outdoor nature of most supplier and job sites, an electronic system to keep track of load tickets and update their status in response to events requires wireless devices carried by personnel at the supplier and job sites. Unfortunately, many of these sites suffer from poor or non-existent wireless connectivity. An electronic digital chain of custody system that can be used, despite occasional lack of wireless connectivity would be highly desirable.

SUMMARY OF EMBODIMENTS

An embodiment of the present invention provides a digital chain of custody system. The system includes an electronic database, a server, and a first communication device.

The electronic database is configured to store electronic load tickets. Each electronic load ticket is associated with a respective haul of construction material by a vehicle. Each electronic load ticket includes respective initial load data, including custody data.

The server is coupled to the electronic database and to a wireless communication network. The server is configured to automatically send ones of the load tickets via the wireless communication network.

The first communication device includes a processor, a memory and a display screen. The first communication device is configured to receive a plurality of first electronic load tickets from the server. The first communication device is also configured to store the plurality of first electronic load tickets in the memory and display, on the display screen, a barcode that encodes one of the plurality of first electronic load tickets stored in the memory.

Optionally, the first communication device includes a portable wireless communication device configured to wirelessly receive the plurality of first electronic load tickets from the server.

Optionally, in any embodiment, the system includes a second communication device. The second communication device includes a processor and a digital camera. The second communication device is configured to capture an image of a barcode with the digital camera and send at least a portion of the barcode to the server.

The server is configured, in response to receipt of the at least a portion of the barcode, to automatically select a corresponding electronic load ticket, of the electronic load tickets stored in the electronic database, that matches the at least a portion of the barcode and alter the corresponding electronic load ticket stored in the electronic database to indicate custody of construction material associated with the corresponding electronic load ticket has been transferred.

Optionally, in any embodiment, the system includes a second communication device. The second communication device includes a processor and a digital camera. The second communication device is configured to capture an image of a barcode with the digital camera. The second communication device is also configured to automatically decode the image of the barcode into a decoded load ticket and automatically generate a load ticket identifier from the decoded load ticket. The second communication device is also configured to send the load ticket identifier to the server.

The server is configured, in response to receipt of the load ticket identifier, to automatically select a corresponding electronic load ticket, of the electronic load tickets stored in the electronic database, that matches the load ticket identifier, and alter the corresponding electronic load ticket stored in the electronic database to indicate custody of construction material associated with the corresponding electronic load ticket has been transferred.

Optionally, any embodiment includes a second communication device. The second communication device includes a processor, a second memory, and a digital camera. The second communication device is configured to receive a plurality of confirmation electronic load tickets from the server and store the plurality of confirmation electronic load tickets in the second memory. The second communication device is also configured to capture an image of a barcode with the digital camera, automatically select a matching confirmation electronic load ticket, of the plurality of confirmation electronic load tickets stored in the second memory, that matches the barcode, and alter the matching confirmation electronic load ticket stored in the second memory to indicate custody of construction material associated with the matching confirmation electronic load ticket has been transferred.

Optionally, in such an embodiment, the second communication device is configured, in response to automatically selecting the matching confirmation electronic load ticket, to send a load ticket identifier of the matching confirmation electronic load ticket to the server, and the server is configured, in response to receipt of the load ticket identifier, to select a corresponding electronic load ticket, stored in the electronic database, that matches the load ticket identifier. The server is also configured to alter the corresponding electronic load ticket stored in the electronic database to indicate custody of construction material associated with the corresponding electronic load ticket has been transferred.

Optionally, in any embodiment, the first communication device includes a user interface. The first communication device is configured to accept, via the user interface, a user input that identifies a departing load ticket of the plurality of first electronic load tickets stored in the memory. In response to the user input, the first communication device is configured to send a load ticket identifier to the server identifying the departing load ticket. The server is configured, in response to receipt of the load ticket identifier from the first communication device, to select a corresponding electronic load ticket, stored in the electronic database, that matches the load ticket identifier from the first communication device, and alter the corresponding electronic load ticket stored in the electronic database to indicate custody of construction material associated with the corresponding electronic load ticket has been transferred.

Optionally, in such an embodiment, the server is further configured, in response to receipt of the load ticket identifier, to alter the corresponding electronic load ticket stored in the electronic database to indicate status of a vehicle associated with the corresponding electronic load ticket has changed.

Optionally, in such an embodiment, the system also includes a second communication device. The second communication device includes a processor and a second memory. The second communication device is configured to receive a plurality of confirmation load tickets from the server and store the plurality of confirmation load tickets in the second memory. The server is further configured, in response to receipt of the load ticket identifier from the first communication device, to send the load ticket identifier to the second communication device. The second communication device is configured, in response to receipt of the load ticket identifier from the server, to select a matching load ticket, of the plurality of confirmation load tickets stored in the second memory, that matches the load ticket identifier from the server, and alter the load status data in the matching load ticket stored in the second memory to indicate load status is "en route."

Optionally, in any embodiment, the system includes a third wireless communication device. The third wireless communication device includes a third memory, a second digital camera, and a second display screen. The third wireless communication device is configured to capture an image of a barcode, store the image of the barcode in the third memory, and display, on the second display screen, the barcode stored in the third memory.

Optionally, in any embodiment, the system includes a third wireless communication device. The third wireless communication device includes a processor, a third memory, and a second display screen. The third wireless communication device is configured to wirelessly receive a first load ticket, store the first load ticket in the third memory, and display, on the second display screen, a barcode that encodes the first load ticket stored in the third memory.

Optionally, in such an embodiment, the third wireless communication device is configured, after receipt of the first load ticket, to wirelessly send a load ticket identifier to the server identifying the first load ticket. The server is configured, in response to receipt of the load ticket identifier, to select a corresponding load ticket stored in the electronic database that matches the load ticket identifier, and alter the custody data in the corresponding load ticket stored in the electronic database to indicate custody has been transferred.

Optionally, in such an embodiment, the third wireless communication device is configured, after receipt of the first load ticket, to wirelessly send a load ticket identifier to the server identifying the first load ticket. The server is configured, in response to receipt of the load ticket identifier, to select a corresponding load ticket stored in the electronic database that matches the load ticket identifier, and alter the load status data in the corresponding load ticket stored in the electronic database to indicate load status is "en route."

Optionally, in any embodiment, the server is configured to automatically generate barcodes, wherein each barcode encodes a respective load ticket, and send ones of the barcodes as images to the first communication device.

Optionally, in any embodiment, the first communication device is configured to generate the barcode from a first load ticket stored in the first memory, wherein the barcode encodes the first load ticket.

Optionally, in any embodiment, the server is configured to automatically generate barcodes, wherein each barcode encodes a respective load ticket, and wirelessly send at least one of the barcodes as an image to a third wireless communication device.

Optionally, in such an embodiment, the third wireless communication device includes a screen and is configured to display the at least one of the barcodes on the display screen.

Optionally, the system includes a third wireless communication device. The third wireless communication device is configured to wirelessly repeatedly send location information about the third wireless communication device to the server. The electronic database is configured to store data defining a plurality of geofences. Each geofence is associated with one of the electronic load tickets. The server is configured to use the location information about the third wireless communication device to automatically detect breach of one of the plurality of geofences by the third wireless communication device. The server is configured, in response to detecting the breach, to automatically select an electronic load ticket, stored in the electronic database, that is associated with the one of the plurality of geofences, and alter the electronic load ticket that is associated with the one of the plurality of geofences to indicate construction material associated with the electronic load ticket has breached the one of the plurality of geofences.

Optionally, the system includes a third wireless communication device. The third wireless communication device includes a processor, a third memory, and a display screen. The third wireless communication device is configured to wirelessly receive a first load ticket that comprises geofence data and store the first load ticket in the third memory. The third wireless communication device is configured to automatically detect breach of the geofence by the third wireless communication device and, in response, wirelessly send a load ticket identifier to the server identifying the first load ticket. The server is configured, in response to receipt of the load ticket identifier from the third wireless communication device, to automatically select a corresponding electronic load ticket, of the electronic load tickets stored in the electronic database, that matches the load ticket identifier, and alter the corresponding electronic load ticket stored in the electronic database to indicate construction material associated with the corresponding electronic load ticket has breached the geofence.

Optionally, such an embodiment includes a second communication device. The second communication device includes a processor, a second memory and a digital camera. The second communication device is configured to receive a plurality of confirmation load tickets from the server and store the plurality of confirmation load tickets in the second memory. The server is configured, in response to receipt of the load ticket identifier from the third wireless communication device, to send a message to the second communication device, wherein the message comprises the load ticket identifier. The second communication device is configured, in response to receipt of the load ticket identifier, to automatically select a corresponding electronic load ticket, of the plurality of confirmation load tickets stored in the second memory, that matches the load ticket identifier, and alter the corresponding electronic load ticket stored in the second memory to indicate the construction material associated with the corresponding electronic load ticket has breached the geofence.

Optionally, the system includes a second communication device. The second communication device includes a user interface. The second communication device is configured to accept, via the user interface, a user input that identifies an accepted load. In response to the user input, the second communication device is configured to send a message to the server identifying the accepted load ticket. The server is configured, in response to receipt of the load ticket identifier from the second communication device, to select a corresponding load ticket stored in the electronic database that matches the load ticket identifier from the second communication device, and alter the custody data in the corresponding load ticket stored in the electronic database to indicate custody has been transferred.

Optionally, the system includes a second communication device. The second communication device includes a second memory, a processor, and a user interface. The second communication device is configured to receive a plurality of confirmation load tickets from the server and store the plurality of confirmation load tickets in the second memory. The second communication device is configured to accept, via the user interface, a user input that identifies an accepted load ticket of the plurality of confirmation load tickets stored in the second memory. In response to the user input, the second communication device is configured to send a message to the server identifying the accepted load ticket. The server is configured, in response to receipt of the load ticket identifier from the second communication device, to select a corresponding load ticket stored in the electronic database that matches the load ticket identifier from the second communication device and alter the custody data in the corresponding load ticket stored in the electronic database to indicate custody has been transferred.

Another embodiment of the present invention provides a digital chain of custody system. The system includes a second communication device. The second communication device includes a processor, a second memory, a user interface, and a digital camera. The second communication device is configured to capture an image of a barcode with the digital camera. The second communication device is configured to automatically decode the image of the barcode into a decoded load ticket. The decoded load ticket is associated with a respective haul of construction material by a vehicle. The decoded load ticket includes a load identifier and custody data. The second communication device is configured to store the decoded load ticket in the second memory. The second communication device is configured to accept, via the user interface, a user input comprising information related to the decoded load ticket and store the information in the second memory. The second communication device is configured to associate, in the second memory, the information stored in the second memory to the decoded load ticket stored in the second memory.

Optionally, such an embodiment includes an electronic database. The electronic database is configured to store electronic load tickets. Each electronic load ticket is associated with a respective haul of construction material by a vehicle. Each electronic load ticket includes respective initial load data, including custody data. A server is coupled to the electronic database. The server is coupled to a wireless communication network. The server is configured to automatically send ones of the electronic load tickets via the wireless communication network.

The second communication device is configured to receive a plurality of confirmation electronic load tickets from the server and store the plurality of confirmation electronic load tickets in the second memory. The second communication device is configured to automatically select a corresponding confirmation electronic load ticket, of the plurality of confirmation electronic load tickets stored in the second memory, that matches the decoded load ticket, and automatically merge the corresponding confirmation electronic load ticket and the decoded load ticket stored in the second memory and, thereby, create a merged electronic load ticket.

Optionally, in such an embodiment, the second communication device is configured to send at least a portion of the merged electronic load ticket to the server. The server is configured to automatically select a corresponding electronic load ticket, of the electronic load tickets stored in the electronic database, that matches the at least a portion of the merged electronic load ticket, and automatically merge the at least a portion of the merged electronic load ticket and the corresponding electronic load ticket stored in the electronic database.

Yet another embodiment of the present invention provides a digital chain of custody system. The system includes an electronic database, a server, and a second communication device.

The electronic database is configured to store electronic load tickets. Each electronic load ticket is associated with a respective haul of construction material by a vehicle. Each electronic load ticket includes respective initial load data, including custody data.

The server is coupled to the electronic database and to a wireless communication network. The server is configured to automatically send ones of the electronic load tickets via the wireless communication network.

The second communication device includes a processor, a second memory, and a digital camera. The second communication device is configured to receive a plurality of confirmation electronic load tickets from the server and store the plurality of confirmation electronic load tickets in the second memory. The second communication device is configured to capture an image of a barcode with the digital camera. The second communication device is configured to automatically select a matching confirmation electronic load ticket, of the plurality of confirmation electronic load tickets stored in the second memory, that matches the barcode. The second communication device is configured to alter the matching confirmation electronic load ticket stored in the second memory to indicate custody of construction material associated with the matching confirmation electronic load ticket has been transferred.

Optionally, in such an embodiment, the second communication device is configured, in response to capture of the image of the barcode, to send a load ticket identifier of the matching confirmation electronic load ticket to the server. The server is configured, in response to receipt of the load ticket identifier, to select a corresponding electronic load ticket, stored in the electronic database, that matches the load ticket identifier, and alter the corresponding electronic load ticket stored in the electronic database to indicate custody of construction material associated with the corresponding electronic load ticket has been transferred.

An embodiment of the present invention provides a digital chain of custody system. The system includes an electronic database, a server, and a second communication device.

The electronic database is configured to store electronic load tickets. Each electronic load ticket is associated with a respective haul of construction material by a vehicle. Each electronic load ticket includes respective initial load data, including custody data.

The server is coupled to the electronic database and to a wireless communication network.

The second communication device includes a processor and a digital camera. The second communication device is configured to capture an image of a barcode with the digital camera and send at least a portion of the barcode to the server.

The server is configured, in response to receipt of the at least a portion of the barcode, to automatically select a corresponding electronic load ticket, of the electronic load tickets stored in the electronic database, that matches the at least a portion of the barcode, and alter the corresponding electronic load ticket stored in the electronic database to indicate custody of construction material associated with the corresponding electronic load ticket has been transferred.

Another embodiment of the present invention provides a digital chain of custody system. The system includes a second communication device. The second communication device includes a processor, a second memory, and a digital camera. The second communication device is configured to store confirmation electronic load tickets in the second memory. Each confirmation electronic load ticket is associated with a respective haul of construction material by a vehicle. Each confirmation electronic load ticket includes respective load data, including custody data. The second communication device is configured to capture an image of a barcode with the digital camera. The second communication device is configured to automatically select a corresponding confirmation electronic load ticket, stored in the second memory, that matches the barcode, and alter the corresponding confirmation electronic load ticket stored in the electronic database to indicate custody of construction material associated with the corresponding confirmation electronic load ticket has been transferred.

Yet another embodiment of the present invention provides a digital chain of custody system. The system includes an electronic database, a server, and a first communication device.

The electronic database is configured to store electronic load tickets. Each electronic load ticket is associated with a haul of construction material by a vehicle. Each electronic load ticket includes initial load data and custody data. Each electronic load ticket is encoded using a barcode, thereby creating a plurality of encoded electronic load tickets.

The server is coupled to the electronic database and to a wireless communication network. The server is configured to transmit ones of the plurality of encoded electronic load tickets via the wireless communication network.

The first communication device includes a processor and a first memory. The first communication device is configured to receive at least one of the plurality of encoded electronic load tickets transmitted from the server and decode the at least one encoded electronic load ticket received. The first communication device is configured to accept from a user supplemental load data additional to the initial load data, associate the supplemental load data with the at least one encoded electronic load ticket received, and transmit to the server the at least one encoded electronic load ticket with the associated supplemental load data.

An embodiment of the present invention provides a non-transitory computer-readable medium. The medium is encoded with instructions. When executed by a processor, the instructions establish processes for performing a computer-implemented method for managing an electronic load ticket associated with a respective haul of construction material by a vehicle, in an environment of unreliable wireless connectivity. The processes include an electronic database process, a server process, and a first communication device process.

The electronic database process is configured to store electronic load tickets. Each electronic load ticket is associated with a respective haul of construction material by a vehicle. Each electronic load ticket includes respective initial load data, including custody data.

The server process is coupled to the database and to a wireless communication network. The server process is configured to automatically send ones of the load tickets via the wireless communication network.

The first communication device process is executed by a processor. The processor is coupled to a memory and a display screen. The first communication device process is configured to receive a plurality of first electronic load tickets from the server and store the plurality of first electronic load tickets in the memory. The first communication device process is configured to display, on the display screen, a barcode that encodes one of the plurality of first electronic load tickets stored in the memory.

An embodiment of the present invention provides a computer-implemented method for managing an electronic load ticket associated with a respective haul of construction material by a vehicle, in an environment of unreliable wireless connectivity. The method includes providing an electronic database. The electronic database is configured to store electronic load tickets. Each electronic load ticket is associated with a respective haul of construction material by a vehicle. Each electronic load ticket includes respective initial load data, including custody data.

A server is provided. The server is coupled to the electronic database and to a wireless communication network. The server is configured to automatically send ones of the load tickets via the wireless communication network.

A first communication device is provided. The first communication device includes a processor, a memory and a display screen.

A plurality of first electronic load tickets is received, by the first communication device, from the server. The plurality of first electronic load tickets is stored, by the first communication device, in the memory. A barcode is displaying, by the first communication device, on the display screen. The barcode encodes one of the plurality of first electronic load tickets stored in the memory.

Another embodiment of the present invention provides a computer-implemented method for managing an electronic load ticket associated with a respective haul of construction material by a vehicle, in an environment of unreliable wireless connectivity. The method includes capturing, by a processor, an image of a barcode with a digital camera of a mobile communication device. The image of the barcode is automatically decoded, by a processor, into a decoded load ticket. The decoded load ticket is associated with the respective haul of construction material by the vehicle. The decoded load ticket includes a load identifier and custody data. The decoded load ticket is storing, by a processor, in a memory of the mobile communication device. A user input is accepted via a user interface of the mobile communication device. The user input includes information related to the decoded load ticket. The information, stored in the memory is associating, in the memory to the decoded load ticket stored in the memory.

BRIEF DESCRIPTION OF THE DRAWINGS

The invention will be more fully understood by referring to the following Detailed Description of Specific Embodiments in conjunction with the Drawings, of which:

FIG. 6 is an exemplary paper load ticket, according to the prior art.

DETAILED DESCRIPTION OF SPECIFIC EMBODIMENTS

Figure 1:
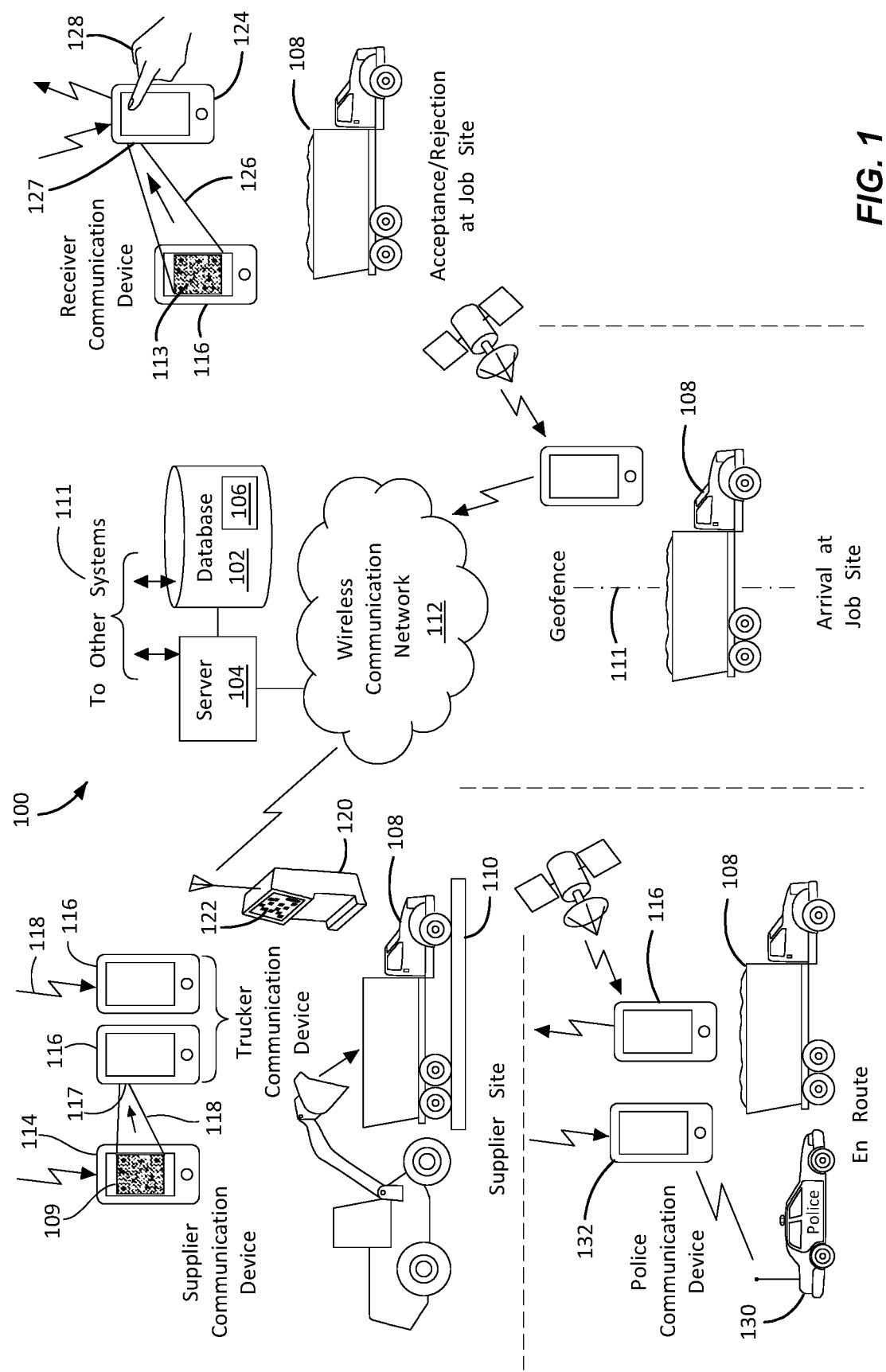
FIG. 1 is a partially schematic diagram of a digital chain of custody system, as well as an environment in which the system operates, according to various embodiments of the present invention.

Embodiments of the present invention provide apparatus and methods for keeping track of electronic digital chains of custody, despite occasional lack of wireless connectivity to mobile devices used by supplier representatives, truckers, and receiver representatives (such as inspectors). FIG. 1 is a partially schematic diagram of some embodiments of the present invention, as well as an environment in which the embodiments may operate. A server 104 maintains an electronic database 102 configured to store electronic load tickets 106. Each electronic load ticket 106 is associated with a respective haul of construction material by a vehicle 108, and each electronic load ticket 106 includes respective initial load data related to the haul, including custody data.

Visual representations, such as quick response (QR) codes 109, are used to encode electronic load tickets and make them optically communicable 118, 126 between user devices, even when or where wireless connectivity is unavailable.

A supplier representative may operate a wireless communication device ("supplier device") 114, such as a mobile telephone, that executes a supplier application program, through which the supplier representative can enter information when a haul load is dispatched from a supplier site. Similarly, a receiver representative may operate a wireless communication device ("receiver device") 124, such as a mobile telephone, that executes a receiver application program that receives, from the server 104, information about load hauls that are en route to a job site, so the receiver representative can be made aware of these load hauls and be ready to inspect them upon their respective arrivals. Through the receiver device 124, the receiver representative can enter information when a haul load is accepted or rejected at a job site, and the receiver device 124 can notify the server 104 of receipt or rejection of the construction material and a corresponding change in custody of the construction material. Optionally a trucker may operate a wireless communication device ("trucker device") 116, such as a mobile telephone, that executes a trucker application program, which facilitates dispatching transactions and/or augmenting electronic load tickets with transaction data. The trucker device 116 can periodically or occasionally notify the server 104 of a then-current location of the trucker device, which typically corresponds to a location of the load being hauled. The server 104 can, thereby, automatically detect breach of a geofence 111, such as upon arrival at a job site, by a truck 108 hauling a load.

The server 104 may communicate wirelessly, such as via a mobile telephone network and/or one or more wireless local area networks (WLANs), with the supplier device 114, the receiver device 124, and the trucker device 116 (collectively "devices"). The server 104 may communicate with application programs executed by these devices 114, 116, 124 to send copies of one or more of the electronic load tickets 106 stored in the database 102 to these devices 114, 116, 124, and each device 114, 116, 124 may store the copy of the electronic load ticket(s) in a memory of the device 114, 116, 124. The server 104 may communicate with application programs executed by these devices 114, 116, 124 to update data stored in memories of the respective devices 114, 116, 124, such as to reflect changes in custody of respective loads, changes in status of the loads, etc. Entire or partial copies of the electronic load tickets 106 may be sent to, and stored by, the devices 114, 116, 124. Similarly, the devices 114, 116, 124 may send partial or entire electronic load tickets, or identifiers thereof, to the server 104, and the server 104 may, in response, alter corresponding electronic load tickets 106 stored in the database 102.

To facilitate operation in an area, or at a time, when wireless connectivity is unavailable, embodiments generate barcodes 109, 113 that encode the electronic load tickets, or portions thereof. As used herein, "encodes" means the pattern of the barcode, when decoded into alphanumeric data, contains a copy of at least a portion of the electronic load ticket 106 data stored in the electronic database 102, not merely a pointer, for example a URL, to where the electronic load ticket 106 can be fetched.

For example, some embodiments generate quick response (QR) codes, which graphically encode data from the electronic load tickets. Although conventionally QR codes are used in advertising to encode Internet web addresses, in the form of uniform resource locators (URLs), a QR code can encode any digital data, including numeric or alphanumeric data. The number of characters that can be encoded in a QR code depends on the QR version (1 to 40) and on a level of error correction (ECC) desired. Four levels of error correction (L, M, Q and H) are available in QR codes. For example, at ECC level "L," 7,089 numeric or 4,296 alphanumeric characters can be encoded in a version 40 QR code. Thus, a properly configured QR code is adequate to encode contents of all or part of an electronic load ticket 106. If necessary, data to be encoded in a QR code may be compressed prior to generating the QR code.

As used herein, a "barcode" is an optically machine-readable representation of data. A barcode may represent data by varying widths and spacings of parallel lines. These barcodes are commonly referred to as linear or one-dimensional (1D) barcodes and can be scanned by conventional optical scanners. Two-dimensional (2D) barcodes use rectangles, dots, hexagons or other patterns, called matrix codes or 2D barcodes, although they do not use bars as such. As used herein, the term "barcode" includes QR code.

If wireless connectivity is not available at a supplier site, a supplier representative may use his supplier device 114 to display a QR code 109 that encodes all or part of an electronic load ticket, and a trucker may capture an image 118 of the QR code using a digital camera 117 in her trucker device 116. In some embodiments, the trucker device 116 simply stores the image 118 of the QR code. When the trucker arrives at a job site, the trucker can use her trucker device 116 to display the QR code image 113 on a screen of the trucker device 116, and a receiver representative may use his receiver device 124 to capture an image 126 of the QR code 113 with a digital camera 127 of the receiver device 124. An application program executed by the receiver device 124 may send the image to the server 104 for decoding, and the server 104 may then alter a corresponding electronic load ticket 106 stored in the database 102.

Alternatively, the receiver device 124 may decode the QR code and send the decoded load ticket to the server 104, or the receiver device 124 may use the decoded load ticket to access a corresponding electronic load ticket stored in a memory of the receiver device 124. In either case, wireless connectivity at the job site is not required to convey identity of the electronic load ticket 106 from the trucker device 116 to the receiver device 124, and thereby convey custody of the load to the owner or contractor.

If the receiver device 124 lacks wireless connectivity, the receiver device 124 may cache information about the electronic load ticket. Later, perhaps when the receiver device is in a different location, or local radio signal propagation characteristics improve, and the receiver device 124 regains wireless connectivity, the receiver device 124 may communicate with the server 104, such as to send a message informing the server 104 of electronic load tickets that represent loads that were received and/or rejected, and the server 104 can make corresponding changes in the database 102, such as to reflect changes in custody of the respective loads.

Thus, embodiments of the present invention provide an electronic digital chain of custody system that can be used, despite occasional lack of wireless connectivity. Such embodiments are described in more detail herein.

As noted, a digital chain of custody system 100 includes an electronic database 102 and a server 104 coupled to the electronic database 102. The electronic database 102 is configured to store electronic load tickets. An exemplary electronic load ticket 106 is shown stored in the electronic database 102. Each electronic load ticket 106 is associated with a respective haul of construction material by a vehicle, exemplified by a dump truck 108. The dump truck 108 is shown in four contexts, i.e. at a supplier site, en route, arriving at a job site, and at acceptance or rejection of the load at the job site.

Each electronic load ticket 106 includes respective initial load data, including custody data. As used herein, the term "ticket" means machine-readable data that identifies a respective haul of construction material by a vehicle. At a minimum, the electronic load ticket 106 includes information that identifies a load and information about custody of the load. The initial load data may be provided electronically or otherwise, for example from a certified weight scale 110 located at the supplier site when the truck 108 is filled. Table 1 contains a non-exclusive list of exemplary data items, some or all of which may be included in the electronic load ticket 106. An electronic load ticket 106 may, however, include different or additional data items, as needed by respective parties who interact with the system 100 or other stakeholders. In general, the data in the electronic load ticket 106 describes construction material that is hauled by a truck and custody data about, and status of, the construction material.

In particular, the data in the electronic load ticket 106 identifies which party currently has custody of the load, although this information may be somewhat out of date, particularly if one or more of the supplier device, the trucker device and/or the receiver device is out of wireless communication range. However, embodiments of the present invention ensure the custody data is updated when wireless connectivity is regained. Who currently has custody of the load may be stored in a dedicated field in the electronic load ticket 106, for example in a "Custody" field. Optionally or alternatively, who currently has custody may be inferred from one or more other fields. For example, if a load has not yet been either accepted or rejected, custody may be inferred to still be in the supplier or the trucker. On the other hand, if the load has been accepted, the owner may be inferred to have custody, but if the load has been rejected, the supplier may be inferred to have custody.

The data in the electronic load ticket 106 may include information about the truck and/or truck driver. For example, a "Status" field may indicate an approximate location of the truck, such as "at supplier site," "en route," "breached geofence," or "at job site."

TABLE 1

| Exemplary Load Ticket Fields |
| --- |
| Unload Location (ex. GPS, GIS, latitude/longitude) |
| Unload Time (timestamp) |
| Unload Start Time (timestamp) |
| Unload End Time (timestamp) |
| Split Ticket (Y/N) |
| Split Tons not included (Tons) |
| Agreed Upon Wasted (Y/N) |
| Wasted Tons not included (Tons) |
| Accepted By Owner Inspector (Y/N) |
| Name of Inspector: |
| Timestamp for Owner Inspector Acceptance |
| Water added by Driver (gallons) |
| Water added by Contractor (gallons) |
| Timestamps for Admixtures Added |
| Description of Admixtures Added |
| Who Added Admixtures |
| In Transit (geofence break timestamp) |
| Arrived at Job site (geofence break timestamp) |
| Acceptance/Rejection Status (if not the Owner Inspector) |

TABLE 1-continued

Exemplary Load Ticket Fields

Who Accepted/Rejected Load
Timestamp for Acceptance/Rejected
Stored Signature for Acceptance/Rejected
Temperature(s)
Temperature Timestamp(s)
Who took the Temperature(s)
QA/QC Test Taken
QA/QC Test Result
Who administered test
When test was administered
Latitude/longitude of test taken
Owner - Pay Item Paid Status
Owner - Project Complete Status
Station Identifier
BIM Identifier
Custody
Status
Invoice Number Table 2 contains a non-exclusive list of exemplary data items, some or all of which may be included in the electronic load ticket 106, for a ready-mix cement load. As with Table 1, an electronic load ticket 106 may include different or additional data items, as needed by respective parties who interact with the system 100.

TABLE 2

Exemplary Load Ticket Fields for Ready-Mix Cement Loads

Material Fields - Additional fields that would be pulled from a source system
Coarse Agg#1 (Description, Design Weight, Required Batch Weight, Actual Batch Weight, Free Water, % Moisture)
Coarse Agg#2 (Description, Design Weight, Required Batch Weight, Actual Batch Weight, Free Water, % Moisture)
Coarse Agg#3 (Description, Design Weight, Required Batch Weight, Actual Batch Weight, Free Water, % Moisture)
Fine Agg (Description, Design Weight, Required Batch Weight, Actual Batch Weight, Free Water, % Moisture)
Cement (Description, Design Weight, Required Batch Weight, Actual Batch Weight, % Moisture)
Pozzolan #1 (Description, Design Weight, Required Batch Weight, Actual Batch Weight)
Pozzolan #2 (Description, Design Weight, Required Batch Weight, Actual Batch Weight)
Air Entrained (Description, Design Weight, Required Batch Weight, Actual Batch Weight)
Admixture #1 (Description, Design Weight, Required Batch Weight, Actual Batch Weight)
Admixture #2 (Description, Design Weight, Required Batch Weight, Actual Batch Weight)
Admixture #3 (Description, Design Weight, Required Batch Weight, Actual Batch Weight) Water Batched (gallon)
Water/Cement Ratio (Batched)

The server 104 and/or the electronic database 102 may be communicatively coupled to one or more other systems 111. For example, the server 104 may be communicatively coupled to the certified weight scale 110 or a sales system of the supplier. The certified weight scale 110 or the sales system of the supplier may provide data about construction material that has been loaded into a truck, such as price, grade, or quantity. The server 104 may use such data to create the electronic load ticket 106. As used herein, the term "initial load data" means data about a load that has been stored in the electronic database 102 by the server 104 or by another system. In general, once initial load data is stored in the electronic database 102, the corresponding load has been loaded into a truck, or will be loaded imminently, and the truck can be considered to have left the supplier site, although the truck may physically still be exiting the supplier site. In many cases, the initial load data indicates that the supplier has custody of the construction material, for example if the truck 108 belongs to the supplier. In most such cases, the supplier has custody until the haul load is accepted by the buyer or contractor. In some cases, the initial load data indicates that the trucker has custody of the construction material, for example if a truck not owned by the supplier hauls the load. However, in other cases, the initial load data may indicate that the supplier has custody of the construction material, even if a non-supplier owned truck hauls the load.

The server 104 is also communicatively coupled to a wireless communication network 112, such as a cellular telecommunication network and/or one or more wireless local area networks (WLANs). The server 104 may be directly communicatively coupled to the wireless communication network 112, or the server 104 may be communicatively coupled to the wireless communication network 112 via one or more other networks, such as the Internet. The wireless communication network 112 may include a combination of zero or more wired and one or more wireless networks. For example, the wireless communication network 112 may include a cellular communication network, a WLAN that serves all or a portion of the supplier site, and a separate WLAN that serves all or a portion of the job site. Each of these networks may include any combination of public and/or private networks, and any combination of local and wide area networks (LANs and/or WANs).

A representative of the supplier may use a mobile communication device 114, such as a mobile telephone. For clarity, the mobile communication device 114 of the supplier representative is referred to herein as a "supplier communication device" or a "first communication device." A supplier application program ("first application program") (not shown) is executed by the supplier communication device 114. When executed, the supplier application program causes the supplier communication device 114 to perform operations described herein. In general, the server 104 and the supplier communication device 114 communicate wirelessly via the wireless communication network 112. However, at some times and/or in some places, the supplier communication device 114 may lack wireless connectivity with the wireless communication network 112.

The server 104 is configured to automatically send copies of ones of the electronic load tickets 106, via the wireless communication network 112, to the supplier communication device 114, and the supplier communication device 114 is configured to receive the electronic load tickets from the server 104 and store the received electronic load tickets in a memory of the supplier communication device 114. For clarity, the electronic load tickets received by the supplier communication device 114 and stored in the memory of the supplier communication device 114 are referred to herein as "supplier electronic load tickets." A supplier electronic load ticket can, but need not necessarily, contain the same fields, a subset of the fields, or a superset of the fields in the corresponding electronic load ticket 106 stored in the electronic database 102.

Optionally, a trucker may use a mobile communication device 116, such as a mobile telephone. For clarity, the mobile communication device 116 of the trucker is referred to herein as a "trucker communication device" or a "third communication device." In some embodiments, a trucker application program ("third application program") (not shown) is executed by the trucker communication device 116. When executed, the trucker application program causes the trucker communication device 116 to perform operations described herein. In these cases, the server 104 and the trucker communication device 116 may communicate wirelessly via the wireless communication network 112. However, at some times and/or in some places, the trucker communication device 116 may lack wireless connectivity with the wireless communication network 112.

In embodiments in which the trucker communication device 116 has wireless connectivity, via the wireless communication network 112, with the server 104, and the trucker communication device 116 executes the trucker application program, the server 104 may wirelessly send (as indicated at 118) a copy of all or a portion of one of the electronic load tickets 106 stored in the electronic database 102 to the trucker communication device 116. In these embodiments, the server 104 is configured to automatically send a copy of one of the electronic load tickets 106, via the wireless communication network 112, to the trucker communication device 116, and the trucker communication device 116 is configured to receive the electronic load ticket from the server 104 and store the received electronic load tickets in a memory of the trucker communication device 116. The sent electronic load ticket 106 represents a load currently in the truck 108 operated by the trucker associated with the trucker communication device 116, or about to be loaded into the truck 108. As noted, the trucker communication device 116 may store the copy, or portion, of the electronic load ticket in a memory of the trucker communication device 116. For clarity, the electronic load ticket received by the trucker communication device 116 and stored in the memory of the trucker communication device 116 is referred to herein as a "trucker electronic load ticket." A trucker electronic load ticket can, but need not necessarily, contain the same fields, a subset of the fields, or a superset of the fields in the corresponding electronic load ticket 106 stored in the electronic database 102.

However, in embodiments in which the trucker communication device 116 does not have wireless connectivity, via the wireless communication network 112, with the server 104, or the trucker communication device 116 does not execute the trucker application program, the supplier mobile device 114 may display a QR code or other suitable barcode (for simplicity, collectively herein referred to as a QR code) that encodes the electronic load ticket 106, or a portion thereof, on a screen of the supplier mobile device 114. In this case, the trucker communication device 116 may include a digital camera 117 to capture an image, as indicated at 118, of the QR code and store the image in a memory of the trucker communication device 116. Most mobile telephones include digital cameras. Thus, even if the trucker's mobile telephone does not execute the trucker application program, the trucker's mobile telephone can act as the trucker communication device 116, in that the trucker's mobile telephone can capture an image of the QR code displayed on the screen of the supplier communication device 114.

In these embodiments, the supplier communication device 114 includes a processor, a memory and a display screen and is configured to receive a plurality of supplier electronic load tickets from the server 104 and store the plurality of supplier electronic load tickets in the memory. The supplier communication device 114 is further configured to display, on the display screen, a barcode that encodes one of the plurality of supplier electronic load tickets stored in the memory. As noted, the supplier communication device 114 may be a portable wireless communication device, such as a mobile telephone or portable tablet computer with wireless capabilities, configured to wirelessly receive the plurality of supplier electronic load tickets from the server 104.

Alternatively, a kiosk 120 may be communicably coupled to the server 104, via the wireless communication network 112 or otherwise. The server 104 may send data to the kiosk 120, and the kiosk 120 may store the data, much as the supplier communication device 114 does, in a memory in the kiosk 120. The kiosk 120 includes a display screen 122 and can display a QR code that encodes the electronic load ticket 106, or a portion thereof, and the trucker communication device 116 may use the digital camera 117 to capture an image of the QR code from the display screen 122, analogous to capturing an image of the QR code from the supplier communication device 114. Thus, as used in the present application, the term "supplier communication device" includes a fixed-in-place kiosk.

A representative of the receiver (ex., project owner or contractor) may use a mobile communication device 124, such as a mobile telephone. For clarity, the mobile communication device 124 of the receiver representative is referred to herein as a "receiver communication device" or a "second communication device." A receiver application program ("second application program") (not shown) is executed by the receiver communication device 124. When executed, the receiver application program causes the receiver communication device 124 to perform operations described herein. In general, the server 104 and the receiver communication device 124 communicate wirelessly via the wireless communication network 112. However, at some times and/or in some places, the receiver communication device 124 may lack wireless connectivity with the wireless communication network 112.

Once the truck 108 arrives at the job site for acceptance or rejection of the load, the trucker can cause display of the QR code on the screen of the trucker communication device 116. If the trucker communication device 116 executes the trucker application program, the trucker can activate the trucker application program and issue an appropriate command, such as via a user interface (UI), to instruct the trucker application program to display the QR code. However, if the trucker communication device 116 does not execute the trucker application program, the trucker can activate the trucker communication device 116 and issue an appropriate command, such as via a user interface (UI), to instruct the trucker communication device 116 to display the QR code. For example, the trucker communication device 116 can be instructed to display a picture stored thereon.

The receiver communication device 124 may capture an image of the QR code, as indicated at 126, using a digital camera 127 in the receiver communication device 116. In some embodiments, the receiver communication device 124 sends a copy of the captured image to the server 104 for processing. The server 104 processes the captured image by decoding the barcode from the image into digital data representing an electronic load ticket and locating a corresponding matching electronic load ticket 106 in the electronic database 102. The server 104 then alters the located corresponding electronic load ticket 106 stored in the electronic database 102 to indicate custody of construction material associated with the corresponding electronic load ticket 106 has been transferred, such as to the owner or contractor. As used in this context, "matches" means the corresponding electronic load ticket 106 in the electronic database 102 is sufficiently similar to the decoded barcode to distinguish the electronic load ticket 106 from other electronic load tickets in the electronic database 102. For example, a combination of project identifier, producer identifier, plant identifier, ticket number and time may be sufficient to distinguish the electronic load ticket 106 from other electronic load tickets stored in the electronic database 102.

In these embodiments, the receiver communication device 124 includes a processor and the digital camera 127 and is configured to capture an image of a barcode with the digital camera 127 and send at least a portion of the barcode to the server 104. In these embodiments, the server 104 is configured, in response to receipt of the at least a portion of the barcode, to automatically select a corresponding electronic load ticket 106, of the electronic load tickets stored in the electronic database 102, that matches the at least a portion of the barcode and alter the corresponding electronic load ticket stored 106 in the electronic database 102 to indicate custody of construction material associated with the corresponding electronic load ticket 106 has been transferred, such as to the owner or contractor.

In some embodiments, the receiver communication device 124 automatically decodes the QR code into a complete or partial electronic load ticket. The receiver communication device 124 may send a load ticket identifier to the server 104. The load ticket identifier may be, for example, the complete or partial decoded electronic load ticket or a global unique identifier (GUID) or a barcode encodement of the complete or partial decoded electronic load ticket or the GUID sufficient to identifythird the electronic load ticket. (Generally an ID of a load ticket. But, could be a copy of all or a part of the load ticket, or a barcode encodement of all or part of the load ticket, to enable the recipient to identify a corresponding load ticket stored in the recipient's memory.) The server 104 or another system may generate the GUID and store the GUID as part of the electronic load ticket 106 in the electronic database 102. Alternatively, the load ticket identifier may be a combination of several fields of the electronic load ticket, sufficient to distinguish the electronic load ticket from other electronic load tickets 106 in the electronic database 102. For example, a combination of project identifier, producer identifier, plant identifier, ticket number and time may be sufficient to distinguish the electronic load ticket from other electronic load tickets 106 stored in the electronic database 102.

In these embodiments, the receiver communication device 124 includes a processor and a digital camera 127 and is configured to capture an image of a barcode with the digital camera127, automatically decode the image of the barcode into a decoded load ticket, automatically generate a load ticket identifier from the decoded load ticket, and send the load ticket identifier to the server 104.

There may, of course, be a delay in sending the image of the QR code, the load ticket identifier, or whatever the receiver communication device 124 sends to the server 104, due to a temporary lack of wireless connectivity between the receiver communication device 124 and the wireless communication network 112. In this case, the receiver communication device 124 maintains the information in a memory of the receiver communication device 124 until wireless connectivity is available.

Once the server 104 receives the information from the receiver communication device 124, the server 104 uses the information to automatically select a corresponding electronic load ticket 106 stored in the electronic database 102 that matches barcode, load ticket identifier, GUID, etc. If necessary, the server 104 decodes the (partial) barcode into decoded digital data (a complete or partial electronic load ticket) and extracts from the decoded digital data one or more fields of the electronic load ticket that were used to generate the barcode. The server 104 uses the extracted field(s) to select a corresponding electronic load ticket 106 in the database 102. The server 104 then alters the corresponding electronic load ticket 106 stored in the electronic database 102 to indicate custody of construction material associated with the corresponding electronic load ticket 106 has been transferred, for example to the owner or contractor.

In these embodiments, the server 104 is configured, in response to receipt of the load ticket identifier, to automatically select a corresponding electronic load ticket 106, of the electronic load tickets stored in the electronic database 102, that matches the load ticket identifier and alter the corresponding electronic load ticket 106 stored in the electronic database 102 to indicate custody of construction material associated with the corresponding electronic load ticket 106 has been transferred, such as to the owner or contractor.

In some contexts, the receiver communication device 124 lacks wireless connectivity to the wireless communication network 112 when a load is inspected and accepted at a job site. To accommodate such situations, in some embodiments, the server 104 sends copies of one or more electronic load tickets to the wireless communication device 124 when wireless connectivity is available, and the receiver communication device 124 stores the copies of the electronic load tickets in a local memory. When a load haul is inspected at a job site, the receiver communication device 124 scans a QR code displayed by a trucker communication device 116 to identify a corresponding electronic load ticket stored in the memory of the receiver communication device 124, and alters custody data and/or other data in the locally-stored copy of a corresponding electronic load ticket. Later, when wireless connectivity is restored, the receiver communication device 124 may send some or all of the altered custody and/or other data to the server 104, and the server alters custody data in a corresponding electronic load ticket 106 stored in the electronic database 102.

In these embodiments, the receiver communication device 124 includes a processor, a second memory, and a digital camera. The receiver communication device 124 is configured to receive a plurality of confirmation electronic load tickets from the server 104 and to store the plurality of confirmation electronic load tickets in the second memory. The receiver communication device 124 is configured to capture an image 126 of a barcode with the digital camera. As noted, the barcode may be displayed by the trucker communication device 116.

The receiver communication device 124 is configured to automatically select a matching confirmation electronic load ticket, of the plurality of confirmation electronic load tickets stored in the second memory, that matches the barcode. The receiver communication device 124 is configured to alter the matching confirmation electronic load ticket stored in the second memory to indicate custody of construction material associated with the matching confirmation electronic load ticket has been transferred.

In order to later, when wireless connectivity is restored, inform the server 104 of the acceptance of the load and/or the transfer of custody, the receiver communication device 124 is configured, in response to automatically selecting the matching confirmation electronic load ticket, to send a load ticket identifier of the matching confirmation electronic load ticket to the server. The server is configured, in response to receipt of the load ticket identifier, to select a corresponding electronic load ticket, stored in the electronic database, that matches the load ticket identifier, and alter the corresponding electronic load ticket stored in the electronic database to indicate custody of construction material associated with the corresponding electronic load ticket has been transferred.

In situations where the supplier site has wireless connectivity, the supplier communication device 114 may accept a user input, such as from a dispatcher, that indicates a load has been picked up, and the supplier communication device 114 can inform the server 104 of the pickup. In these embodiments, the supplier communication device 114 includes a user interface and is configured to accept, via the user interface, a user input that identifies a departing load ticket of the plurality of supplier electronic load tickets stored in the memory. The supplier communication device 114 is further configured, in response to the user input, to send a load ticket identifier to the server 104 identifying the departing load ticket.

The server 104 is configured, in response to receipt of the load ticket identifier from the supplier communication device 114, to select a corresponding electronic load ticket 106, stored in the electronic database 102, that matches the load ticket identifier from the supplier communication device 114. The server 104 is further configured to alter the corresponding electronic load ticket 106 stored in the electronic database 102 to indicate custody of construction material associated with the corresponding electronic load ticket has been transferred, such as to a trucker. In cases where the truck is owned, employed or operated by the owner of the project, the server 104 may be configured to alter the corresponding electronic load ticket 106 to indicate custody of construction material has been transferred to the owner.

Optionally, the server 104 is further configured, in response to receipt of the load ticket identifier, to alter the corresponding electronic load ticket 106 stored in the electronic database 102 to indicate status of a vehicle associated with the corresponding electronic load ticket 106 has changed, such as to "en route" or "left supplier site."

Optionally, when a load is picked up at the supplier site, the server 104 can notify the receiver communication device 124. In such an embodiment, the receiver communication device 124 includes a processor and a second memory and is configured to receive a plurality of confirmation load tickets from the server 104 and store the plurality of confirmation load tickets in the second memory. The server 104 is further configured, in response to receipt of the load ticket identifier from the supplier communication device 114, to send the load ticket identifier to the receiver communication device 124. The receiver communication device 124 is configured, in response to receipt of the load ticket identifier from the server 104, to select a matching load ticket, of the plurality of confirmation load tickets stored in the second memory, that matches the load ticket identifier from the server, and alter the load status data in the matching load ticket stored in the second memory to indicate load status is "en route." Alternatively, the receiver communication device 124 marks the electronic ticket in its memory to indicate custody was transferred to the trucker.

In situations where the supplier site does not have wireless connectivity, a trucker may use her portable communication device 116 to capture an image 118 of a QR code displayed on the supplier communication device 114 (including the kiosk 120). The QR code encodes the electronic load ticket. Thus, the trucker can display an image of the QR code when the trucker arrives at the job site. In this case, a first trucker wireless communication device 116 includes a third memory, a second digital camera 117, and a second display screen. The first trucker wireless communication device 116 is configured to capture an image of a barcode, store the image of the barcode in the third memory, and display, on the second display screen, the barcode stored in the third memory.

Optionally or alternatively, the trucker portable communication device 116 executes an application program and can wirelessly receive information about the electronic load ticket from the server 104. In this case, a second trucker wireless communication device 116 includes a processor, a third memory, and a second display screen, and is configured to wirelessly receive a supplier load ticket, store the supplier load ticket in the third memory, and display, on the second display screen, a barcode that encodes the supplier load ticket stored in the third memory. The ability to display the barcode at the job site enables the trucker to identify the load ticket to the receiver communication device 124 optically, i.e., even if the job site lacks wireless connectivity.

Optionally, the trucker wireless communication device 116 can notify the server 104, once a load has been picked up. In this embodiment, the second trucker wireless communication device 116 is configured, after receipt of the supplier load ticket, to wirelessly send a load ticket identifier to the server 104 identifying the supplier load ticket. The server 104 is configured, in response to receipt of the load ticket identifier, to select a corresponding load ticket 106 stored in the electronic database 102 that matches the load ticket identifier and alter the custody data in the corresponding load ticket 106 stored in the electronic database 102 to indicate custody has been transferred, such as to the trucker.

Optionally, the trucker wireless communication device 116 can notify the server 104, once a load has been picked up, and the server can alter the corresponding electronic load ticket 106 in the electronic database 102 to indicate the load is "en route." In this embodiment, the second trucker wireless communication device 116 is configured, after receipt of the supplier load ticket, to wirelessly send a load ticket identifier to the server 104 identifying the supplier load ticket. The server 104 is configured, in response to receipt of the load ticket identifier, to select a corresponding load ticket 106 stored in the electronic database 102 that matches the load ticket identifier and alter the load status data in the corresponding load ticket 106 stored in the electronic database 102 to indicate load status is "en route."

As noted, in some embodiments, the supplier communication device 114, or the kiosk 120, displays a QR code that encodes an electronic load ticket. The supplier communication device 114 or kiosk 120 can generate the QR code, or the server 104 can generate the QR code and send the generated QR code to the supplier communication device 114 or the kiosk 120. Thus, in some embodiments, the supplier communication device 114 is configured to generate the barcode from a supplier load ticket stored in the first memory, wherein the barcode encodes the supplier load ticket. In some embodiments, the server 104 is configured to automatically generate barcodes, wherein each barcode encodes a respective load ticket 106, and send ones of the barcodes as images to the supplier communication device 114.

In some embodiments, the server 104 sends an image of a QR code to a trucker mobile communication device 116, such as via an SMS message. In such embodiments, the trucker mobile communication device 116 need not execute an application as described herein. Instead, the trucker mobile communication device 116 may use conventional tools to receive, store and display an image of the QR code. Thus, the server 104 may be configured to automatically generate barcodes, wherein each barcode encodes a respective load ticket 106, and wirelessly send at least one of the barcodes as an image to a trucker wireless communication device 116. The trucker wireless communication device 116 may include a screen and may be configured to display the at least one of the barcodes on the display screen.

In some cases, a geofence may be defined at or around a job site. The geofence may be a straight or non-straight line. The geofence can, but need not necessarily, define a closed shape. For example, a geofence may be defined only across an entrance to a job site, i.e., the geofence need not necessarily extend around the entire job site. In some embodiments, the system automatically detects when a truck hauling a load crosses a geofence. In response to detecting a truck breaching a geofence, the server 104 may alter a corresponding electronic load ticket 106 in the electronic database 102 to indicate the load has arrived at the job site.

Optionally or alternatively, the server 104 may notify the receiver communication device 124 that the load has arrived, and the receiver communication device 124 can alter its local copy of the corresponding load ticket to so indicate. The receiver communication device 124 can alert a user, such as an inspector, of the arrival of the load, such as by sounding an alarm or flashing an indicator on the screen of the receiver communication device 124.

The electronic database 102 can store information about each geofence. The geofence information can be stored as part of an electronic load ticket 106 and/or the geofence information can be stored in a separate portion of the electronic database 102 or in a separate database (not shown) and the geofence information can be associated with respective electronic load tickets 106. A separate database that stores geofence information is considered to be part of the electronic database 102. The geofence information can be provided by a separate application (not shown). All the electronic load tickets 106 need not necessarily have associated geofence information.

In some embodiments, the trucker wireless communication device 116 includes a navigation system, such as a global positioning system receiver (GPSr). Such a wireless communication device 116 can repeatedly, periodically or occasionally, wirelessly report its position to the server 104. The server can automatically determine when the position of the wireless communication device 116 crosses a geofence associated with a load that is associated with the wireless communication device 116. For example, the server 104 can compare each new position of a wireless communication device 116 to a list of geofences.

In some embodiments, the wireless communication device 116 executes an application program that stores information about the geofence. Such an application program can automatically determines when the position of the wireless communication device 116 crosses the geofence and notify the server 104.

Thus, in some embodiments, a second trucker wireless communication device 116 is configured to wirelessly repeatedly send location information about the second trucker wireless communication device 116 to the server 104. The electronic database 102 is configured to store data defining a plurality of geofences. Each geofence is associated with one of the electronic load tickets 106. The server 104 is configured to use the location information about the second trucker wireless communication device 116 to automatically detect breach of one of the plurality of geofences by the second trucker wireless communication device 116 and automatically select an electronic load ticket 106, stored in the electronic database 102, that is associated with the breached geofence. The server 104 is configured to alter the electronic load ticket 106 that is associated with the breached geofence to indicate construction material associated with the electronic load ticket 106 has breached the geofence.

In some embodiments, a second trucker wireless communication device 116 includes a processor, a third memory, and a display screen, and is configured to wirelessly receive a supplier load ticket that includes geofence data. The second trucker wireless communication device 116 is configured to store the supplier load ticket in the third memory and automatically detect breach of the geofence by the second trucker wireless communication device 116. The second trucker wireless communication device 116 is configured to wirelessly send a load ticket identifier to the server 104 identifying the supplier load ticket.

The server 104 is configured, in response to receipt of the load ticket identifier from the second trucker wireless communication device 116, to automatically select a corresponding electronic load ticket, of the electronic load tickets 106 stored in the electronic database 102, that matches the load ticket identifier. The server 104 is configured to alter the corresponding electronic load ticket 106 stored in the electronic database 102 to indicate construction material associated with the corresponding electronic load ticket 106 has breached the geofence.

In either case, optionally, the receiver communication device 124 includes a processor, a second memory and a digital camera and is configured to receive a plurality of confirmation load tickets from the server 104 and store the plurality of confirmation load tickets in the second memory. The server 104 is configured, in response to receipt of the load ticket identifier from the second trucker wireless communication device, or in response to detecting breach of the geofence, to send a message to the receiver communication device 124, wherein the message includes the load ticket identifier. The receiver communication device 124 is configured, in response to receipt of the load ticket identifier, to automatically select a corresponding electronic load ticket, of the plurality of confirmation load tickets stored in the second memory, that matches the load ticket identifier and alter the corresponding electronic load ticket stored in the second memory to indicate the construction material associated with the corresponding electronic load ticket has breached the geofence.

The receiver communication device 124 may include a user interface (indicated at 128), by which a user, such as an inspector, can indicate that a particular load has been accepted. In some cases, the receiver communication device 124 stores, in a local memory, copies of electronic load tickets that represent loads that are expected to be delivered to the job site. When one such load is delivered and accepted, the user can select one of the electronic load tickets stored in the memory of the receiver communication device 124.

In some cases, the receiver communication device 124 does not store, in its local memory, a copy of the electronic load ticket that represents the load that was delivered to the job site. For example, in some embodiments, the receiver communication device 124 does not store any electronic load ticket. In these cases, the receiver communication device 124 accepts, via a user interface, an identification of the load that was delivered. The identification can, for example, be an electronic load ticket identifier, a QR code imaged and decoded by the receiver communication device 124, or the contents of one or more fields of the electronic load ticket, sufficient to uniquely identify the electronic load ticket 106.

The receiver communication device 124 can wirelessly inform the server 104 of the acceptance, and the server 104 can alter custody data in the electronic database 102. If the receiver communication device 124 is out of wireless communication with the wireless communication network 112, the receiver communication device 124 stored information about the acceptance, until wireless connectivity is restored, and then the receiver communication device 124 sends a message to the server 104 regarding the acceptance.

Thus, in some embodiments, the receiver communication device 124 includes a user interface and is configured to accept, via the user interface, a user input that identifies an accepted load. In response to the user input, the receiver communication device 124 is configured to send a message to the server 104 identifying the accepted load ticket. The server 104 is configured, in response to receipt of the load ticket identifier from the receiver communication device 124, to select a corresponding load ticket stored 106 in the electronic database 102 that matches the load ticket identifier from the receiver communication device 124 and alter the custody data in the corresponding load ticket 104 stored in the electronic database to indicate custody has been transferred, such as to the owner.

In some embodiments, the receiver communication device 124 includes a second memory, a processor, and a user interface, and is configured to receive a plurality of confirmation load tickets from the server 104 and store the plurality of confirmation load tickets in the second memory. The receiver communication device 124 is configured to accept, via the user interface, a user input that identifies an accepted load ticket of the plurality of confirmation load tickets stored in the second memory and, in response to the user input, send a message to the server 104 identifying the accepted load ticket.

The server 104 is configured, in response to receipt of the load ticket identifier from the receiver communication device 124, to select a corresponding load ticket stored in the electronic database that matches the load ticket identifier from the receiver communication device and alter the custody data in the corresponding load ticket stored in the electronic database to indicate custody has been transferred, such as to the owner.

As noted, in some cases, a supplier, trucker or receiver communication device 114, 116 or 124 temporarily lacks wireless connectivity with the wireless communication network 112. The supplier communication device 114 may be configured to locally cache information while unable to wirelessly communicate via the wireless communication network 112, and then send the cached information to the server 104, when wireless connectivity is regained. Similarly, the receiver communication device 124 may be configured to locally cache information while unable to wirelessly communicate via the wireless communication network 112, and then send the cached information to the server 104, when wireless connectivity is regained. Similarly, the second trucker wireless communication device 116 may be configured to locally cache information while unable to wirelessly communicate via the wireless communication network 112, and then send the cached information to the server 104, when wireless connectivity is regained. The server 104 may be configured to cache data, while an intended recipient device 114, 116 or 124 is unable to wirelessly communicate vie the wireless communication network 112, and then send the cached data to the device 114, 116 or 124, when wireless connectivity is regained.

In place of a mobile telephone, the supplier communication device 114, the trucker wireless communication device 116 or the receiver communication device 124 can be any suitable portable computing device, such as a tablet computer.

Optionally, the application program executed by the trucker device can decode the QR code into the full or partial electronic load ticket data and store the decoded load ticket data in a memory of the trucker device.

As noted, in situations where the receiver communication device 124 lacks wireless connectivity, the trucker communication device 116 can display an image of a barcode 113 on the screen of the trucker communication device 116, and the receiver communication device 124 can use a camera 127 to capture an image 126 of the barcode 113. The receiver communication device 124 can decode the barcode into an electronic load ticket (referred to herein as a "decoded load ticket") and store the electronic load ticket in a memory of the receiver communication device 124, even if the receiver communication device 124 did not previously receive a copy of the electronic load ticket from the server 104.

Upon inspecting the load, the user of the receiver communication device 124 can enter information into the receiver communication device 124 to indicate the load has been accepted or rejected, and the receiver communication device 124 stores this information in the memory of the receiver communication device 124, in association with the electronic load ticket stored in the memory of the receiver communication device 124.

Thus, the receiver communication device 124 includes a processor, a second memory, a user interface, and a digital camera 127 and is configured to capture an image 126 of a barcode with the digital camera 127. The receiver communication device 124 is configured to automatically decode the image of the barcode into a decoded load ticket. The decoded load ticket is associated with a respective haul of construction material by a vehicle 108, and the decoded load ticket comprises a load identifier and custody data. The receiver communication device 124 is configured to store the decoded load ticket in the second memory, accept, via the user interface, a user input comprising information related to the decoded load ticket, store the information in the second memory, and associate, in the second memory, the information stored in the second memory to the decoded load ticket stored in the second memory.

The receiver communication device 124 can receive a copy of the electronic load ticket 106 (referred to herein as a "confirmation electronic load ticket") from the server 104, either before or after the load has been accepted or rejected. Once the receiver communication device 124 receives the copy of the electronic load ticket 106 from the server 104, and the load has been accepted or rejected, the receiver communication device 124 merges the confirmation electronic load ticket and the decoded load ticket, resulting in a merged electronic load ticket.

Thus, the electronic database 102 is configured to store electronic load tickets, each electronic load ticket 106 being associated with a respective haul of construction material by a vehicle 108, and each electronic load ticket 106 comprising respective initial load data, including custody data. The server 104 is coupled to the electronic database 102 and to the communication network 112 and is configured to automatically send ones of the electronic load tickets via the communication network.

The receiver communication device 124 is configured to receive a plurality of confirmation electronic load tickets from the server 104 and store the plurality of confirmation electronic load tickets in the second memory. The receiver communication device 124 is configured to automatically select a corresponding confirmation electronic load ticket, of the plurality of confirmation electronic load tickets stored in the second memory, that matches the decoded load ticket and automatically merge the corresponding confirmation electronic load ticket and the decoded load ticket stored in the second memory and, thereby, create a merged electronic load ticket.

When the receiver communication device 124 has wireless connectivity, it can send a copy of the merged electronic load ticket to the server 104, which can then merge information in the merged electronic load ticket into the corresponding electronic load ticket 106 in the electronic database 102.

Thus, the receiver communication device 124 is configured to send at least a portion of the merged electronic load ticket to the server 104, and the server 104 is configured to automatically select a corresponding electronic load ticket 106, of the electronic load tickets stored in the electronic database 102, that matches the at least a portion of the merged electronic load ticket. The server 104 is further configured to automatically merge the at least a portion of the merged electronic load ticket and the corresponding electronic load ticket stored in the electronic database.

The receiver communication device 124 need not necessarily receive a user input to accept or reject a load. For example, scanning a barcode displayed on a trucker communication device 116 may indicate to the application program being executed by the receiver communication device 124 that the load has been accepted.

Thus, the electronic database 102 is configured to store electronic load tickets, each electronic load ticket 106 being associated with a respective haul of construction material by a vehicle, and each electronic load ticket 106 including respective initial load data, including custody data. The server 104 is coupled to the electronic database 102 and to the communication network 112 and is configured to automatically send ones of the electronic load tickets via the communication network.

The receiver communication device 124 includes a processor, a second memory, and a digital camera 127 and is configured to receive a plurality of confirmation electronic load tickets from the server 104 and store the plurality of confirmation electronic load tickets in the second memory. The receiver communication device 124 is configured to capture an image 126 of a barcode with the digital camera 127, automatically select a matching confirmation electronic load ticket, of the plurality of confirmation electronic load tickets stored in the second memory, that matches the barcode, and alter the matching confirmation electronic load ticket stored in the second memory to indicate custody of construction material associated with the matching confirmation electronic load ticket has been transferred.

The receiver communication device 124 can send a load ticket identifier to the server 104, after scanning a barcode to accept a load, and the server can alter the custody data in the corresponding electronic load ticket 106 in the electronic database 102.

Thus, the receiver communication device 124 is configured, in response to capture of the image 126 of the barcode 113, to send a load ticket identifier of the matching confirmation electronic load ticket to the server 104, and the server 104 is configured, in response to receipt of the load ticket identifier, to select a corresponding electronic load ticket 106, stored in the electronic database 102, that matches the load ticket identifier, and alter the corresponding electronic load ticket 106 stored in the electronic database 102 to indicate custody of construction material associated with the corresponding electronic load ticket has been transferred.

Rather than decode a barcode imaged by the camera 127 of the receiver communication device 124, the receiver communication device 124 can send a copy of the image, or a portion thereof, to the server 104 for processing.

Thus, the electronic database 102 is configured to store electronic load tickets, each electronic load ticket 106 being associated with a respective haul of construction material by a vehicle 108, and each electronic load ticket 108 including respective initial load data, including custody data. The server 104 is coupled to the electronic database 102 and to the communication network 112.

The receiver communication device 124 includes a processor and a digital camera 127 and is configured to capture an image 126 of a barcode 113 with the digital camera 127 and send at least a portion of the barcode to the server 104. The server 104 is configured, in response to receipt of the at least a portion of the barcode, to automatically select a corresponding electronic load ticket 106, of the electronic load tickets stored in the electronic database 102, that matches the at least a portion of the barcode, and alter the corresponding electronic load ticket 106 stored in the electronic database 102 to indicate custody of construction material associated with the corresponding electronic load ticket 106 has been transferred.

Although embodiments that include a server 104 have been described, other embodiments do not necessarily include a server. In such embodiments, the receiver communication device 124 may store confirmation load tickets in its memory. The receiver communication device 124 can capture an image 126 of a barcode displayed by the trucker communication device 116 and alter a corresponding confirmation load ticket stored in the memory.

Thus, a receiver communication device 124 may include a processor, a second memory, and a digital camera 127 and be configured to store confirmation electronic load tickets in the second memory. Each confirmation electronic load ticket may be associated with a respective haul of construction material by a vehicle 108, and each confirmation electronic load ticket includes respective load data, including custody data. The receiver communication device 124 may be configured to capture an image 126 of a barcode 113 with the digital camera 127, automatically select a corresponding confirmation electronic load ticket, stored in the second memory, that matches the barcode 113, and alter the corresponding confirmation electronic load ticket stored in the electronic database 102 to indicate custody of construction material associated with the corresponding confirmation electronic load ticket 106 has been transferred.

The application program executed by the receiver communication device 124 can accept user input, such as from an inspector, and associate the user input with an electronic load ticket received from the server 104. The user input may include, for example, an indication the load is accepted or rejected. Optionally or alternatively, the user input may include an observation by the inspector, such as an indication of quality or quantity of the load. Optionally or alternatively, the user input may include information about a test performed on the load, such as a sample number and/or a result of the test.

Thus, the electronic database 102 is configured to store electronic load tickets, each electronic load ticket 106 is associated with a haul of construction material by a vehicle 108, and each electronic load ticket 106 includes initial load data and custody data. Each electronic load ticket 106 is encoded using a barcode 109, thereby creating a plurality of encoded electronic load tickets. The server 104 is coupled to the electronic database 102 and to the wireless communication network 112 and is configured to transmit ones of the plurality of encoded electronic load tickets via the wireless communication network 112.

The first communication device 124 includes a processor and a first memory and is configured to receive at least one of the plurality of encoded electronic load tickets transmitted from the server 104. Optionally, the first communication device 124 is configured to decode the at least one encoded electronic load ticket received. The first communication device 124 is configured to accept 128 from a user supplemental load data additional to the initial load data and associate the supplemental load data with the at least one encoded electronic load ticket received, or with one of the at least one encoded electronic load ticket received. The first communication device 124 is further configured to transmit to the server 104 the supplemental load data. Optionally, the first communication device 124 is configured to transmit to the server 104 the at least one encoded electronic load ticket or the first communication device 124 is configured to transmit to the server 104 the one of the at least one encoded electronic load ticket received.

Figure 2:
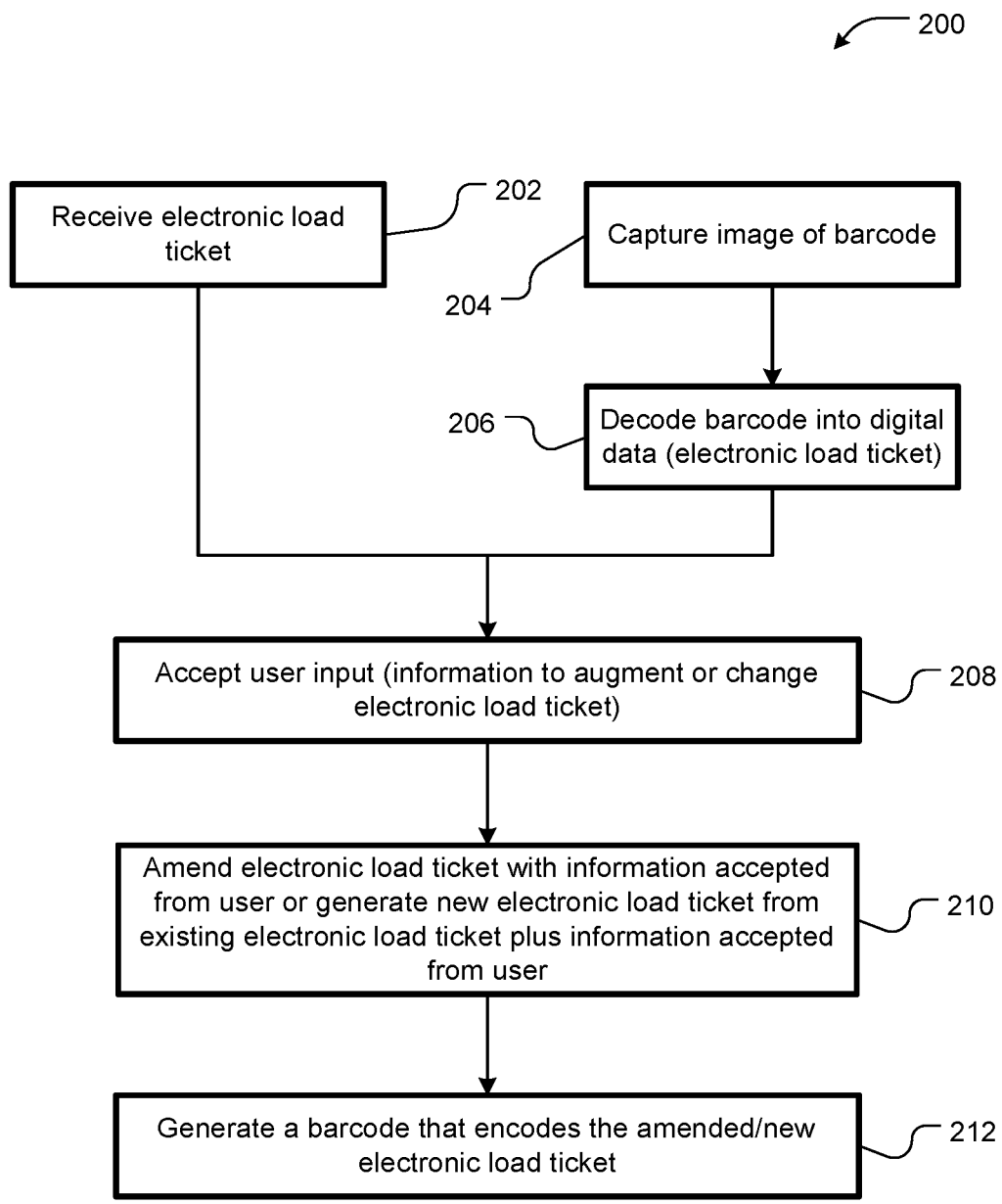
FIG. 2 is a flowchart that schematically illustrates a process for generating a new barcode, based on user input, according to an embodiment of the present invention.

FIG. 2 is a flowchart that schematically illustrates a process for generating a new barcode, based on user input. In some cases, the supplier communication device 114, the receiver communication device 124, or the trucker communication device 116 receives an electronic load ticket, and a user of the device 114, 124 or 116 inputs information related to the load associated with the electronic load ticket. The information input by the user can, for example, supply, alter or replace contents of a field of an electronic load ticket. Optionally or alternatively, the information input by the user can be in addition to fields of the electronic load ticket.

For example, a dispatcher at a supplier site might input a time at which the load leaves the supplier site, input a free-text note about a known deficiency in the load, such as an explanation of missing or damaged goods being hauled, or input special instructions for handling the load, once the load arrives at a job site. An inspector at the job site might input an indication that a load is accepted or rejected, input a time at which the load arrives at the job site, input a free-text note describing an observed deviation from expected condition of the load, or input a sample number related to the load. Similarly, the trucker might input a free-text note describing an observation the trucker made about the load, such as an unexpected noise made by shifting materials in the load en route, or an explanation of difficulty hauling the load, such as traffic along the route that delayed the trucker.

As shown in FIG. 2, and as described herein, in some embodiments, the user device 114, 124 or 116 receives 202 an electronic load ticket wirelessly from the server 104. As noted, the user device 114, 124 or 116 may receive 202 a plurality of electronic load tickets wirelessly from the server 104 and store each electronic load ticket in a memory of the user device 114, 124 or 116.

In some embodiments, the device 114, 124 or 116 captures 204 an image 118 or 126 of a barcode 109 or 113 and decodes 206 the barcode 109, 113 into digital data of an electronic load ticket. As noted, the user device 114, 124 or 116 may store the electronic load ticket in a memory of the user device 114, 124 or 116.

As noted, in either case, all or part of the electronic load ticket 106 stored in the electronic database 102 may be received by the user device 114, 124 or 116 or represented by the barcode 109 or 113 imaged by the user device 114, 124 or 116.

At 208, the user device 114, 124, 116 accepts a user input. The application program executed by the user device 114, 124, 116 includes a suitable user interface to accept the user input. For example, if the user input is intended to indicate acceptance or rejection of the load, the user interface may present two or more suitably labeled buttons. If the user input is intended to include free text, the user interface may present an input area box and a virtual keyboard.

At 210, the application program executed by the user device 114, 124, 116 amends the electronic load ticket with the information input by the user. If the user device 114, 124, 116 stores more than one electronic load ticket, the user device 114, 124, 116 selects an electronic load ticket that corresponds to the load being processed, which may involve prompting the user and requiring the user to enter load-identifying information, such as selecting from a displayed list of loads or electronic load tickets. However, in most cases, the corresponding load may be automatically determined based on context, such as the most recently scanned barcode.

Amending the electronic load ticket may involve storing, altering or replacing contents of a field of an existing electronic load ticket. Optionally or alternatively, amending the electronic load ticket may involve generating a new or provisional electronic load ticket by combining information from an existing load ticket and the information input by the user.

A "provisional electronic load ticket" is one that has not yet been accepted as a true electronic load ticket. For example if a receiver communication device 124 lacks wireless connectivity, the receiver communication device 124 may not be able to verify authenticity of a scanned barcode. In such a case, the receiver communication device 124 may designate the generated electronic load ticket "provisional." Once wireless connectivity is regained, the receiver communication device 124 can send the provisional electronic load ticket to the server 104 for processing or request verification from the server 104 that the provisional electronic load ticket is valid.

In these cases, the server 104 can access the electronic database 102 to locate a corresponding electronic load ticket 106 that matches, or approximately matches, the provisional electronic load ticket. If the server 104 validates the provisional electronic load ticket, the server 104 updates the corresponding electronic load ticket 106 in the electronic database 102 with information from the provisional electronic load ticket. Optionally, the server 104 sends a message to the receiver communication device 124 confirming the validity of the provisional electronic load ticket, and the receiver communication device 124 may remove the provisional designation from the electronic load ticket, merge the provisional and original electronic load ticket, or replace the original electronic load ticket with the provisional electronic load ticket.

At 212, the application program executed by the user device 114, 124, 116 generates a barcode that encodes the amended or new electronic load ticket, i.e., including the information entered by the user. This generated barcode can be used to send the contents of the revised electronic load ticket to another system, for example from the supplier communication device 114, via the trucker communication device 116, to the receiver communication device 124. Thus, the electronic load ticket can be a "living document" that is changeable throughout the life of a load, and a new barcode can be generated when the contents of the electronic load ticket change.

As noted, other system 111 may interface with the server 104 and/or the electronic database 102. For example, optionally, law enforcement, such as police 130 may access information in the electronic database 102, such as via an application program executed by a law enforcement communication device 132 and/or a special interface to the server 104 or the electronic database 102.

If the weight scale 110 used to weigh the truck 108 at the supplier site is trusted, the police 130 may access the electronic database 102 to verify that a given truck 108 meets maximum weight regulations for a given route. For example, the police 130 may observe the truck 108 en route and use the truck's registration (license plate) number to access the electronic database 102 to read the truck's current weight, as recorded by the certified scale 111, without necessarily stopping the truck 108. If the electronic load ticket 106 indicates the truck's gross weight does not exceed a regulation, the police 130 need not stop the truck 108.

Figure 4:
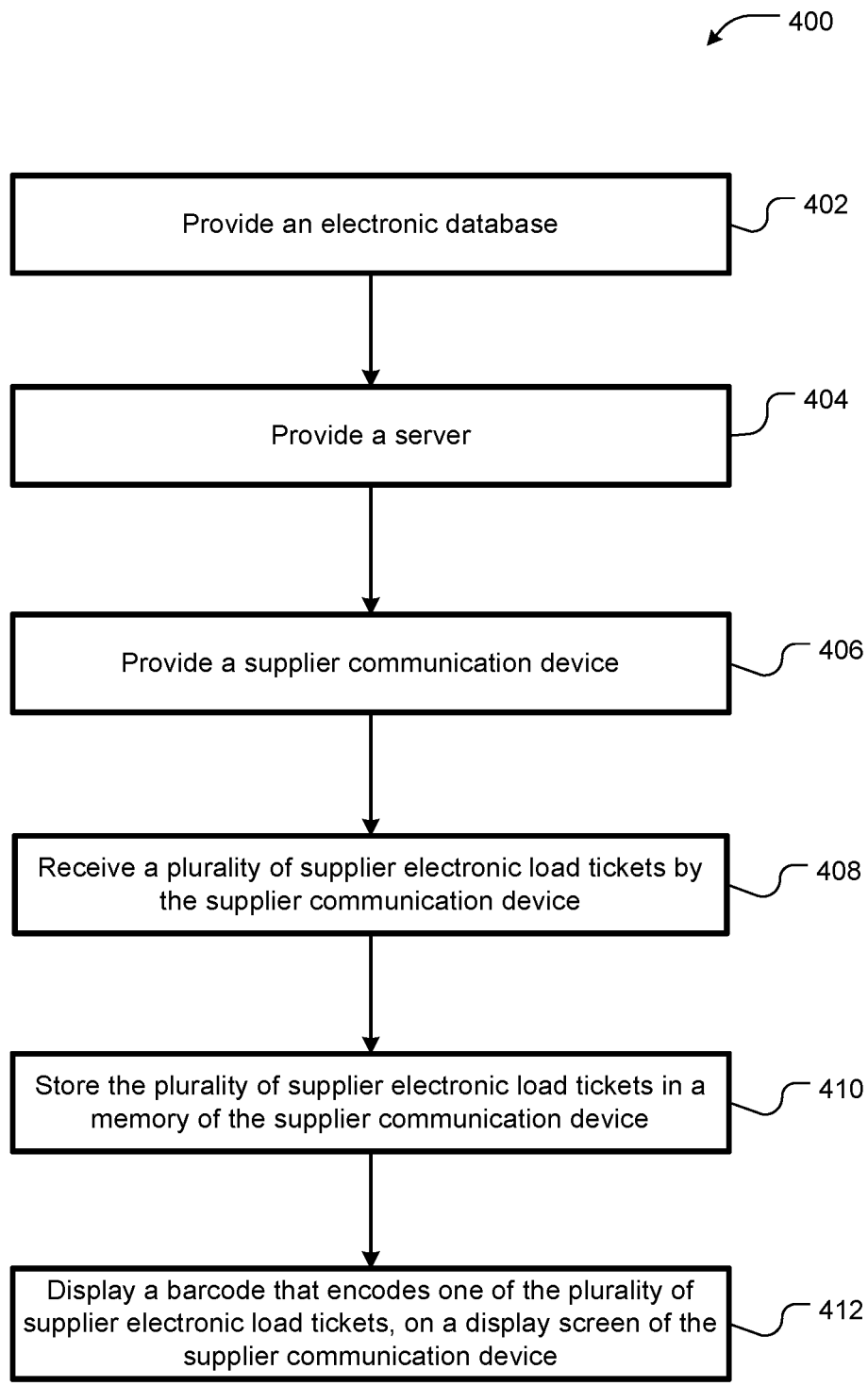
FIG. 4 is a flowchart schematically illustrating a computer-implemented method for managing an electronic load ticket associated with a respective haul of construction material by a vehicle, in an environment of unreliable wireless connectivity, according to an embodiment of the present invention.

FIG. 4 is a flowchart schematically illustrating a computer-implemented method 400 for managing an electronic load ticket associated with a respective haul of construction material by a vehicle, in an environment of unreliable wireless connectivity. The method includes providing 402 an electronic database 102 configured to store electronic load tickets, each electronic load ticket 106 being associated with a respective haul of construction material by a vehicle 108, and each electronic load ticket 106 including respective initial load data, including custody data.

At 404, a server 104 is provided. The server 104 is coupled to the database 102 and to a wireless communication network 112 and configured to automatically send ones of the load tickets via the wireless communication network 112;

At 406, a supplier communication device 114 is provided. The supplier communication device 114 includes a processor, a memory and a display screen.

At 408, a plurality of supplier electronic load tickets is received, by the supplier communication device 114, from the server 104.

At 410, the plurality of supplier electronic load tickets is stored, by the supplier communication device 114, in the memory.

At 412, a barcode 109 that encodes one of the plurality of supplier electronic load tickets stored in the memory is displayed, by the supplier communication device 124, on the display screen.

Figure 5:
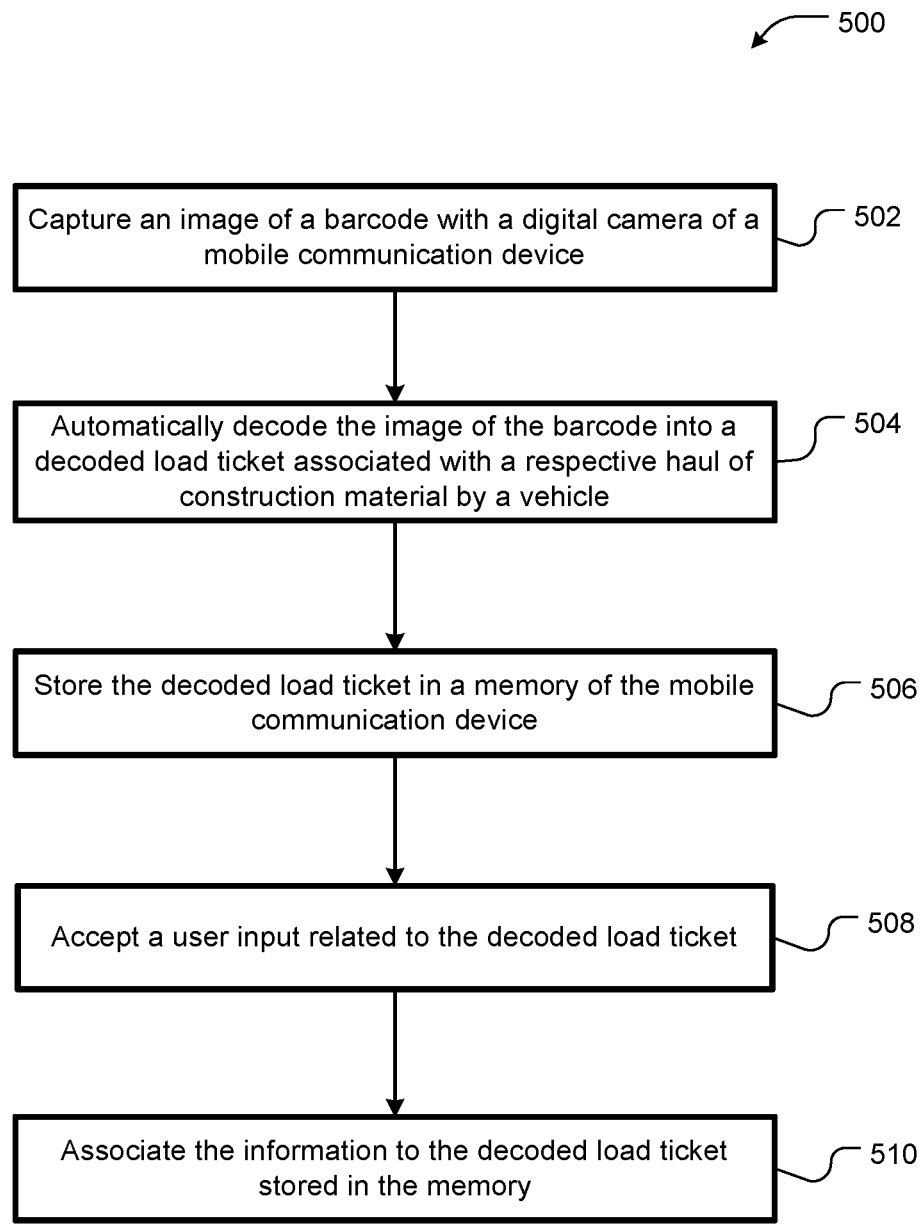
FIG. 5 is a flowchart schematically illustrating a computer-implemented method for managing an electronic load ticket associated with a respective haul of construction material by a vehicle, in an environment of unreliable wireless connectivity, according to an embodiment of the present invention.

FIG. 5 is a flowchart schematically illustrating a computer-implemented method 500 for managing an electronic load ticket associated with a respective haul of construction material by a vehicle, in an environment of unreliable wireless connectivity. The method includes capturing 502 an image 126 of a barcode 113 with a digital camera 127 of a mobile communication device 124. At 504, the image of the barcode 113 is automatically decoded into a decoded load ticket, wherein the decoded load ticket is associated with the respective haul of construction material by the vehicle 108, and the decoded load ticket includes a load identifier and custody data. At 506, the decoded load ticket is stored in a memory of the mobile communication device 124. At 508, a user input 128 is accepted, via a user interface of the mobile communication device 124. The user input 128 includes information related to the decoded load ticket. At 510, the information is associated, in the memory, to the decoded load ticket stored in the memory.

While the invention is described through the above-described exemplary embodiments, modifications to, and variations of, the illustrated embodiments may be made without departing from the inventive concepts disclosed herein. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The server 104, the supplier communication device 114, the trucker wireless communication device 116, the receiver communication device 124, police communication device 130, etc. or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

Figure 3:
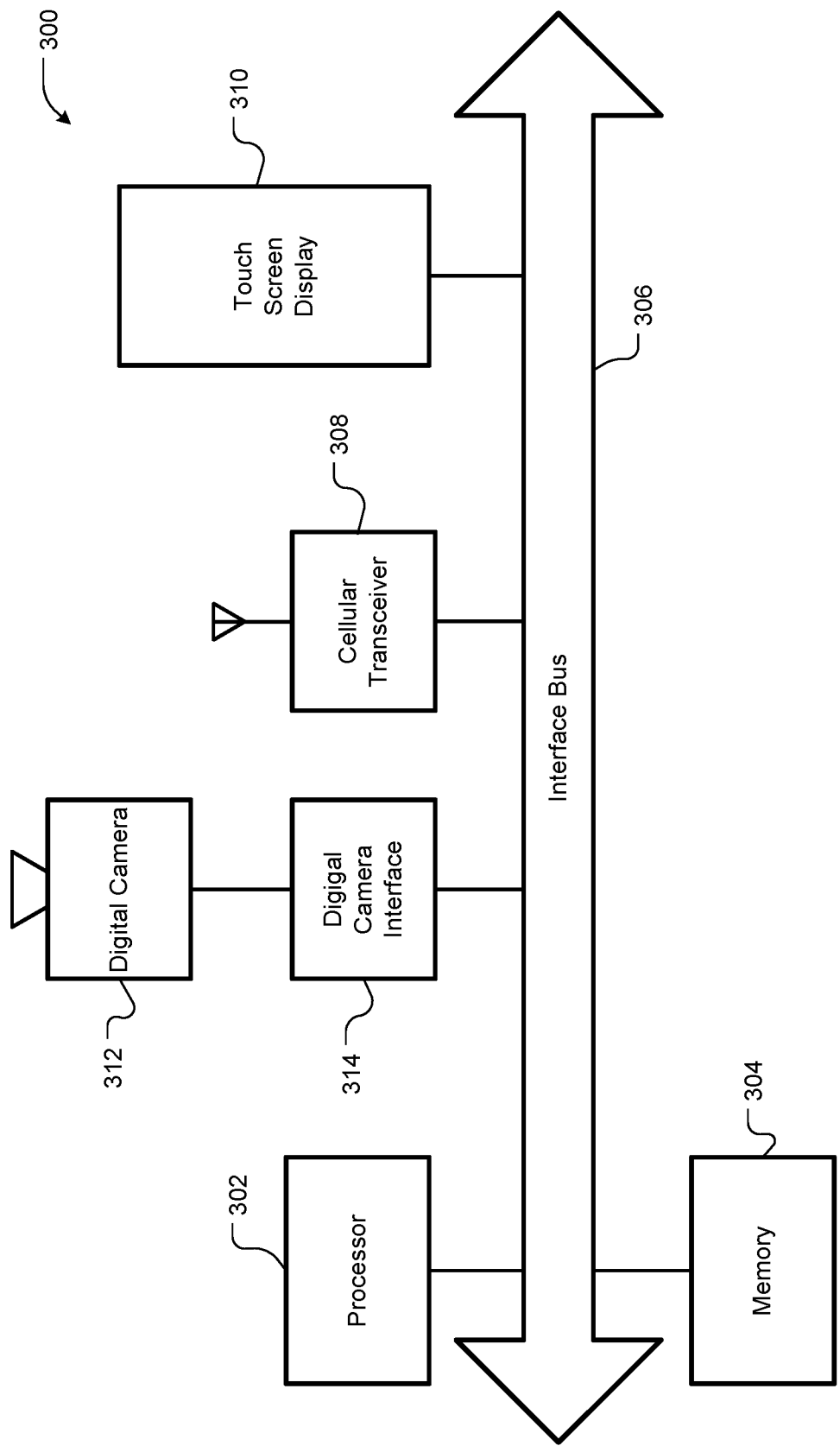
FIG. 3 is a block diagram schematically illustrating a user communication device, according to an embodiment of the present invention.

FIG. 3 is a block diagram schematically illustrating a user communication device 300, such as the supplier communication device 114, the trucker wireless communication device 116, the receiver communication device 124, or the police communication device 130. Such a user communication device 300 includes a processor 302 and a memory 304 communicably coupled to each other via an interface bus 306. A cellular transceiver 308 and a suitable display device, such as a touch screen display 310, are also coupled to the processor 302 and/or the memory 304 via the interface bus 306. In embodiments that require a digital camera, a suitable digital camera 312 is coupled to the interface bus 306 via a suitable digital camera interface 314. The server 104 may be implemented with hardware components similar to those described with respect to FIG. 3, save for the digital camera and, in some cases, the cellular transceiver 308.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective communication devices from one another and are not intended to indicate any particular order or total number of communication devices in any particular embodiment. Thus, for example, a given embodiment may include only a second communication devices and a third communication devices.

What is claimed is:

1. A digital chain of custody system, the system comprising:
    an electronic database configured to store electronic load tickets, each electronic load ticket being associated with a respective haul of construction material by a vehicle, and each electronic load ticket comprising respective initial load data, including custody data;
    a server coupled to the electronic database and to a wireless communication network and configured to automatically send ones of the load tickets via the wireless communication network;
    a first communication device comprising a processor, a memory and a display screen and configured to:
        receive a plurality of first electronic load tickets from the server;
        store the plurality of first electronic load tickets in the memory; and
        display, on the display screen, a barcode that encodes one of the plurality of first electronic load tickets stored in the memory.

2. A digital chain of custody system according to claim 1, wherein the first communication device comprises a portable wireless communication device configured to wirelessly receive the plurality of first electronic load tickets from the server.

3. A digital chain of custody system according to claim 1, further comprising:
    a second communication device comprising a processor and a digital camera and configured to:
        capture an image of a barcode with the digital camera; and
        send at least a portion of the barcode to the server;
    wherein the server is configured, in response to receipt of the at least a portion of the barcode, to:
        automatically select a corresponding electronic load ticket, of the electronic load tickets stored in the electronic database, that matches the at least a portion of the barcode; and
        alter the corresponding electronic load ticket stored in the electronic database to indicate custody of construction material associated with the corresponding electronic load ticket has been transferred.

4. A digital chain of custody system according to claim 1, further comprising:
    a second communication device comprising a processor and a digital camera and configured to:
        capture an image of a barcode with the digital camera;
        automatically decode the image of the barcode into a decoded load ticket;
        automatically generate a load ticket identifier from the decoded load ticket;
        send the load ticket identifier to the server;
    wherein the server is configured, in response to receipt of the load ticket identifier, to:
        automatically select a corresponding electronic load ticket, of the electronic load tickets stored in the electronic database, that matches the load ticket identifier; and
        alter the corresponding electronic load ticket stored in the electronic database to indicate custody of construction material associated with the corresponding electronic load ticket has been transferred.

5. A digital chain of custody system according to claim 1, further comprising:
    a second communication device comprising a processor, a second memory, and a digital camera and configured to:
        receive a plurality of confirmation electronic load tickets from the server;
        store the plurality of confirmation electronic load tickets in the second memory;
        capture an image of a barcode with the digital camera;
        automatically select a matching confirmation electronic load ticket, of the plurality of confirmation electronic load tickets stored in the second memory, that matches the barcode; and
        alter the matching confirmation electronic load ticket stored in the second memory to indicate custody of construction material associated with the matching confirmation electronic load ticket has been transferred.

6. A digital chain of custody system according to claim 1, wherein:
    the second communication device is configured, in response to automatically selecting the matching confirmation electronic load ticket, to send a load ticket identifier of the matching confirmation electronic load ticket to the server; and
    the server is configured, in response to receipt of the load ticket identifier, to:
        select a corresponding electronic load ticket, stored in the electronic database, that matches the load ticket identifier; and
        alter the corresponding electronic load ticket stored in the electronic database to indicate custody of construction material associated with the corresponding electronic load ticket has been transferred.

7. A digital chain of custody system according to claim 1, wherein:
    the first communication device comprises a user interface and is configured to:

accept, via the user interface, a user input that identifies a departing load ticket of the plurality of first electronic load tickets stored in the memory; and
in response to the user input, send a load ticket identifier to the server identifying the departing load ticket; and
the server is configured, in response to receipt of the load ticket identifier from the first communication device, to:
select a corresponding electronic load ticket, stored in the electronic database, that matches the load ticket identifier from the first communication device; and
alter the corresponding electronic load ticket stored in the electronic database to indicate custody of construction material associated with the corresponding electronic load ticket has been transferred.

8. A digital chain of custody system according to claim 7, wherein the server is further configured, in response to receipt of the load ticket identifier, to alter the corresponding electronic load ticket stored in the electronic database to indicate status of a vehicle associated with the corresponding electronic load ticket has changed.

9. A digital chain of custody system according to claim 7, further comprising:
a second communication device comprising a processor and a second memory and configured to:
receive a plurality of confirmation load tickets from the server; and
store the plurality of confirmation load tickets in the second memory; and wherein:
the server is further configured, in response to receipt of the load ticket identifier from the first communication device, to send the load ticket identifier to the second communication device; and
the second communication device is configured, in response to receipt of the load ticket identifier from the server, to:
select a matching load ticket, of the plurality of confirmation load tickets stored in the second memory, that matches the load ticket identifier from the server; and
alter the load status data in the matching load ticket stored in the second memory to indicate load status is "en route".

10. A digital chain of custody system according to claim 1, further comprising a third wireless communication device comprising a third memory, a second digital camera, and a second display screen, and configured to:
capture an image of a barcode;
store the image of the barcode in the third memory; and
display, on the second display screen, the barcode stored in the third memory.

11. A digital chain of custody system according to claim 1, further comprising a third wireless communication device comprising a processor, a third memory, and a second display screen, and configured to:
wirelessly receive a first load ticket;
store the first load ticket in the third memory; and
display, on the second display screen, a barcode that encodes the first load ticket stored in the third memory.

12. A digital chain of custody system according to claim 11, wherein:
the third wireless communication device is configured, after receipt of the first load ticket, to wirelessly send a load ticket identifier to the server identifying the first load ticket; and
the server is configured, in response to receipt of the load ticket identifier, to:
select a corresponding load ticket stored in the electronic database that matches the load ticket identifier; and
alter the custody data in the corresponding load ticket stored in the electronic database to indicate custody has been transferred.

13. A digital chain of custody system according to claim 11, wherein:
the third wireless communication device is configured, after receipt of the first load ticket, to wirelessly send a load ticket identifier to the server identifying the first load ticket; and
the server is configured, in response to receipt of the load ticket identifier, to:
select a corresponding load ticket stored in the electronic database that matches the load ticket identifier; and
alter the load status data in the corresponding load ticket stored in the electronic database to indicate load status is "en route".

14. A digital chain of custody system according to claim 1, wherein the server is configured to automatically:
generate barcodes, wherein each barcode encodes a respective load ticket; and
send ones of the barcodes as images to the first communication device.

15. A digital chain of custody system according to claim 1, wherein the first communication device is configured to generate the barcode from a first load ticket stored in the first memory, wherein the barcode encodes the first load ticket.

16. A digital chain of custody system according to claim 1, wherein the server is configured to automatically:
generate barcodes, wherein each barcode encodes a respective load ticket; and
wirelessly send at least one of the barcodes as an image to a third wireless communication device.

17. A digital chain of custody system according to claim 16, wherein the third wireless communication device comprises a screen and is configured to display the at least one of the barcodes on the display screen.

18. A digital chain of custody system according to claim 1, further comprising:
a third wireless communication device configured to wirelessly repeatedly send location information about the third wireless communication device to the server; wherein:
the electronic database is configured to store data defining a plurality of geofences, each geofence being associated with one of the electronic load tickets; and
the server is configured to:
use the location information about the third wireless communication device to automatically detect breach of one of the plurality of geofences by the third wireless communication device;
automatically select an electronic load ticket, stored in the electronic database, that is associated with the one of the plurality of geofences; and
alter the electronic load ticket that is associated with the one of the plurality of geofences to indicate construction material associated with the electronic load ticket has breached the one of the plurality of geofences.

19. A digital chain of custody system according to claim 1, further comprising:

a third wireless communication device comprising a processor, a third memory, and a display screen, and configured to:
wirelessly receive a first load ticket that comprises geofence data;
store the first load ticket in the third memory;
automatically detect breach of the geofence by the third wireless communication device; and
wirelessly send a load ticket identifier to the server identifying the first load ticket;
wherein the server is configured, in response to receipt of the load ticket identifier from the third wireless communication device, to:
automatically select a corresponding electronic load ticket, of the electronic load tickets stored in the electronic database, that matches the load ticket identifier; and
alter the corresponding electronic load ticket stored in the electronic database to indicate construction material associated with the corresponding electronic load ticket has breached the geofence.

20. A digital chain of custody system according to claim 19, further comprising:
a second communication device comprising a processor, a second memory and a digital camera and configured to:
receive a plurality of confirmation load tickets from the server; and
store the plurality of confirmation load tickets in the second memory; and wherein:
the server is configured, in response to receipt of the load ticket identifier from the third wireless communication device, to send a message to the second communication device, wherein the message comprises the load ticket identifier; and
the second communication device is configured, in response to receipt of the load ticket identifier, to:
automatically select a corresponding electronic load ticket, of the plurality of confirmation load tickets stored in the second memory, that matches the load ticket identifier; and
alter the corresponding electronic load ticket stored in the second memory to indicate the construction material associated with the corresponding electronic load ticket has breached the geofence.

21. A digital chain of custody system according to claim 1, further comprising a second communication device that comprises a user interface and is configured to:
accept, via the user interface, a user input that identifies an accepted load; and
in response to the user input, send a message to the server identifying the accepted load ticket; and
wherein the server is configured, in response to receipt of the load ticket identifier from the second communication device, to:
select a corresponding load ticket stored in the electronic database that matches the load ticket identifier from the second communication device; and
alter the custody data in the corresponding load ticket stored in the electronic database to indicate custody has been transferred.

22. A digital chain of custody system according to claim 1, further comprising a second communication device that comprises a second memory, a processor, and a user interface and is configured to:
receive a plurality of confirmation load tickets from the server;
store the plurality of confirmation load tickets in the second memory;
accept, via the user interface, a user input that identifies an accepted load ticket of the plurality of confirmation load tickets stored in the second memory; and
in response to the user input, send a message to the server identifying the accepted load ticket; and
wherein the server is configured, in response to receipt of the load ticket identifier from the second communication device, to:
select a corresponding load ticket stored in the electronic database that matches the load ticket identifier from the second communication device; and
alter the custody data in the corresponding load ticket stored in the electronic database to indicate custody has been transferred.

23. A digital chain of custody system, the system comprising a second communication device comprising a processor, a second memory, a user interface, and a digital camera and configured to:
capture an image of a barcode with the digital camera;
automatically decode the image of the barcode into a decoded load ticket, wherein the decoded load ticket is associated with a respective haul of construction material by a vehicle, and the decoded load ticket comprises a load identifier and custody data;
store the decoded load ticket in the second memory;
accept, via the user interface, a user input comprising information related to the decoded load ticket;
store the information in the second memory; and
associate, in the second memory, the information stored in the second memory to the decoded load ticket stored in the second memory.

24. A digital chain of custody system according to claim 23, further comprising:
an electronic database configured to store electronic load tickets, each electronic load ticket being associated with a respective haul of construction material by a vehicle, and each electronic load ticket comprising respective initial load data, including custody data; and
a server coupled to the electronic database and to a wireless communication network and configured to automatically send ones of the electronic load tickets via the wireless communication network; and
wherein the second communication device is configured to:
receive a plurality of confirmation electronic load tickets from the server;
store the plurality of confirmation electronic load tickets in the second memory;
automatically select a corresponding confirmation electronic load ticket, of the plurality of confirmation electronic load tickets stored in the second memory, that matches the decoded load ticket; and
automatically merge the corresponding confirmation electronic load ticket and the decoded load ticket stored in the second memory and, thereby, create a merged electronic load ticket.

25. A digital chain of custody system according to claim 24, wherein:
the second communication device is configured to send at least a portion of the merged electronic load ticket to the server; and
the server is configured to:
automatically select a corresponding electronic load ticket, of the electronic load tickets stored in the electronic database, that matches the at least a portion of the merged electronic load ticket; and automatically merge the at least a portion of the merged electronic load ticket and the corresponding electronic load ticket stored in the electronic database.

26. A non-transitory computer-readable medium encoded with instructions that, when executed by a processor, establish processes for performing a computer-implemented method for managing an electronic load ticket associated with a respective haul of construction material by a vehicle, in an environment of unreliable wireless connectivity, the processes comprising:

an electronic database configured to store electronic load tickets, each electronic load ticket being associated with a respective haul of construction material by a vehicle, and each electronic load ticket comprising respective initial load data, including custody data;

a server coupled to the database and to a wireless communication network and configured to automatically send ones of the load tickets via the wireless communication network; and a first communication device process executed by a processor coupled to a memory and a display screen, the first communication device process being configured to:

receive a plurality of first electronic load tickets from the server;

store the plurality of first electronic load tickets in the memory; and display, on the display screen, a barcode that encodes one of the plurality of first electronic load tickets stored in the memory.

27. A computer-implemented method for managing an electronic load ticket associated with a respective haul of construction material by a vehicle, in an environment of unreliable wireless connectivity, the method comprising, by a processor:

capturing an image of a barcode with a digital camera of a mobile communication device;

automatically decoding the image of the barcode into a decoded load ticket, wherein the decoded load ticket is associated with the respective haul of construction material by the vehicle, and the decoded load ticket comprises a load identifier and custody data;

storing the decoded load ticket in a memory of the mobile communication device;

accepting, via a user interface of the mobile communication device, a user input comprising information related to the decoded load ticket; and associating, in the memory, the information stored in the memory to the decoded load ticket stored in the memory.

\* \* \* \* \*